US011274936B2

(12) United States Patent
Ostafew et al.

(10) Patent No.: US 11,274,936 B2
(45) Date of Patent: Mar. 15, 2022

(54) SAFETY-ASSURED REMOTE DRIVING FOR AUTONOMOUS VEHICLES

(71) Applicants: Nissan North America, Inc., Franklin, TN (US); Renault S.A.S., Boulogne-Billancourt (FR)

(72) Inventors: Christopher Ostafew, Mountain View, CA (US); Thiago Aguiar, Farmington Hills, MI (US); Atsuhide Kobashi, Sunnyvale, CA (US); David Ilstrup, Santa Cruz, CA (US); Sachin Hagaribommanahalli, Sunnyvale, CA (US); Qizhan Tam, Santa Clara, CA (US); Therese Cypher-Plissart, Sunnyvale, CA (US)

(73) Assignees: Nissan North America, Inc., Franklin, TN (US); Renault S.A.S., Boulogne-Billancourt (FR)

(*) Notice: Subject to any disclaimer, the term of this patent is extended or adjusted under 35 U.S.C. 154(b) by 230 days.

(21) Appl. No.: 16/683,685

(22) Filed: Nov. 14, 2019

(65) Prior Publication Data
US 2021/0148726 A1    May 20, 2021

(51) Int. Cl.
*G01C 21/36* (2006.01)
*G05D 1/00* (2006.01)

(52) U.S. Cl.
CPC ....... *G01C 21/3667* (2013.01); *G05D 1/0088* (2013.01); *G05D 2201/0213* (2013.01)

(58) Field of Classification Search
CPC ............. G01C 21/3667; G05D 1/0088; G05D 2201/0213
See application file for complete search history.

(56) References Cited

U.S. PATENT DOCUMENTS

2010/0148948 A1    6/2010  Murphy et al.
2011/0178698 A1    7/2011  Aben et al.
(Continued)

OTHER PUBLICATIONS

Long Distance Teleoperation—Avatar; <https://www.nrec.ri.cmu.edu/solutions/defense/other-projects/long-distance-teleoperation.html>; National Robotics Engineering Center, Carnegie Mellon University; 2018.

*Primary Examiner* — Mathew Franklin Gordon
(74) *Attorney, Agent, or Firm* — Young Basile Hanlon & MacFarlane, P.C.

(57) ABSTRACT

An apparatus for traveling through a transportation network performs a method including generating a display that includes a geographical area about a starting location for route assistance through the transportation network and a virtual vehicle at the starting location, and forming a virtual path for the route assistance using the virtual vehicle. The virtual path includes a first portion obtained from advancing the virtual vehicle from the starting location while an autonomous vehicle (AV) is at the starting location and a second portion obtained from, after the virtual vehicle departs from the starting location, extrapolating from the virtual vehicle through the geographical area to a stopping location or an ending location of the route assistance. Points along the virtual path are continually transmitted to a trajectory planner of the AV while the virtual vehicle advances through the geographical area, and the trajectory planner generates a route for the AV conforming to the virtual path.

20 Claims, 16 Drawing Sheets

(56) References Cited

U.S. PATENT DOCUMENTS

| | | |
|---|---|---|
| 2017/0192437 A1 | 7/2017 | Bier et al. |
| 2018/0196437 A1 | 7/2018 | Herbach et al. |
| 2018/0253977 A1 | 9/2018 | Oshida et al. |
| 2018/0259349 A1 | 9/2018 | Kusano et al. |
| 2019/0160675 A1* | 5/2019 | Paschall, II ............ B25J 9/1666 |
| 2019/0294159 A1* | 9/2019 | Pedersen .............. G05D 1/0088 |

* cited by examiner

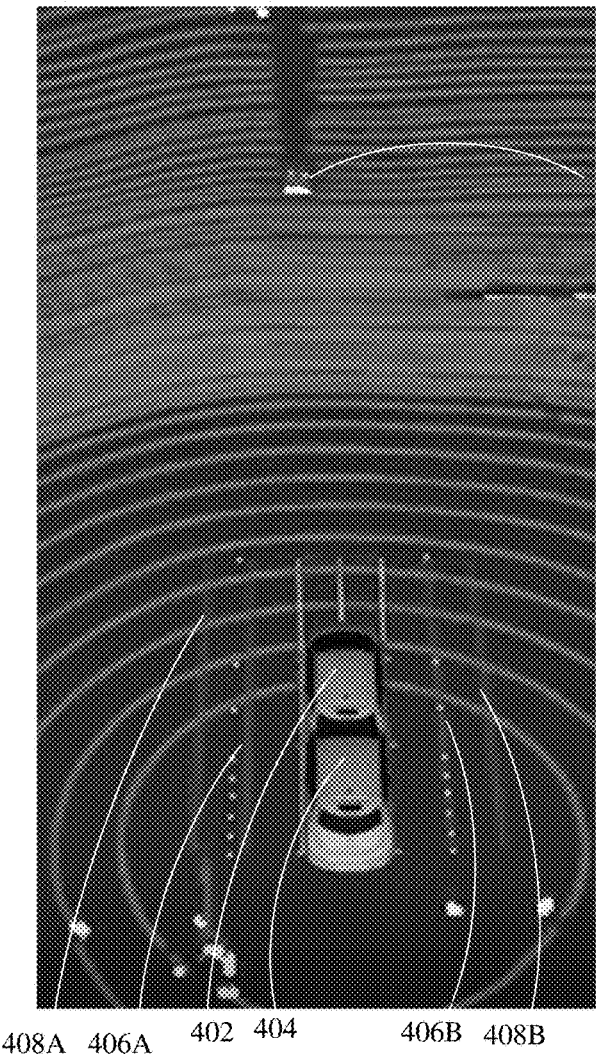
FIG. 6A
408A 406A 402 404 406B 408B
FIG. 6B
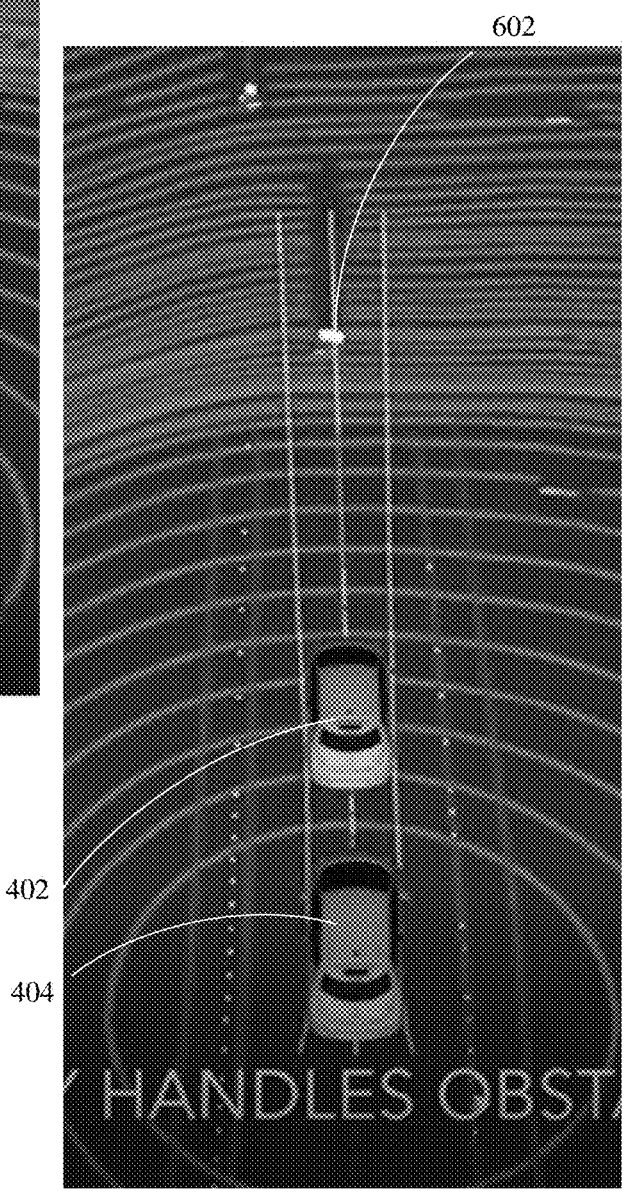

SAFETY-ASSURED REMOTE DRIVING FOR AUTONOMOUS VEHICLES

TECHNICAL FIELD

This application relates to autonomous vehicles, including methods, apparatuses, systems, and non-transitory computer-readable media for supporting travel of autonomous vehicles through a transportation network.

BACKGROUND

Increasing autonomous vehicle usage creates the potential for more efficient movement of passengers and cargo through a transportation network. Moreover, the use of autonomous vehicles can result in improved vehicle safety and more effective communication between vehicles. However, autonomous vehicles may encounter conditions traveling through a transportation network that they are unable to handle without assistance.

SUMMARY

Disclosed herein are aspects, features, elements, and implementations for safety assurance during remote support for an autonomous vehicle.

An aspect of the disclosed implementations is an apparatus for traveling through a transportation network including a communication device and a processor in connection with the communication device and configured to perform a method. The method includes generating a display that includes a geographical area about a starting location for route assistance for an autonomous vehicle (AV) through the transportation network, and a virtual vehicle at the starting location, forming a virtual path for the route assistance using the virtual vehicle where the virtual path includes a first portion obtained from advancing the virtual vehicle from the starting location while the AV is at the starting location and a second portion obtained from, after the virtual vehicle departs from the starting location, extrapolating from the virtual vehicle towards a stopping location or an ending location of the route assistance, and continually transmitting, via the communication device, points along the virtual path to a trajectory planner of the AV while the virtual vehicle advances towards the end location (i.e., while the second portion is being formed), wherein the trajectory planner generates a route for the AV conforming to the virtual path.

An aspect of the disclosed implementations is a system for traveling through a transportation network including a communication device and a processor in connection with the communication device and configured to perform a method. The method includes transmitting, via the communication device, a request for route assistance through the transportation network for an AV, wherein the request includes a starting location of the route assistance, and continually receiving points along a virtual path for the route assistance, the virtual path created by generating a display including a geographical area about the starting location and a virtual vehicle at the starting location and forming the virtual path using the virtual vehicle, the virtual path including a first portion obtained from advancing the virtual vehicle from the starting location while the AV is at the starting location and a second portion obtained from, after the virtual vehicle departs from the starting location, extrapolating from the virtual vehicle through the geographical area to a stopping location or an ending location of the route assistance. The points along the virtual path are continually received, via the communication device, while the virtual vehicle advances through the geographical area. The apparatus also includes a trajectory planner that generates a route for the AV conforming to the virtual path using the points while avoiding nearby static or dynamic objects, and a trajectory follower that generates control inputs for the AV to follow the route while the virtual vehicle advances through the geographical area.

An aspect of the disclosed implementations is an AV for traveling through a transportation network, including a communication device, and one or more processors in connection with the communication device and implementing a trajectory planner and a trajectory follower. The trajectory planner is configured to continually receive, through the communication device, points along a virtual path for route assistance through the transportation network, the virtual path created by generating a display, the display including a geographical area about a starting location for the route assistance and a virtual vehicle at the starting location, and forming the virtual path using the virtual vehicle. The virtual path includes a first portion obtained from advancing the virtual vehicle from the starting location while the AV is at the starting location and a second portion obtained from, after the virtual vehicle departs from the starting location, extrapolating from the virtual vehicle through the geographical area to a stopping location or an ending location of the route assistance. The trajectory planner continually receives, via the communication device, the points along the virtual path while the virtual vehicle advances through the geographical area. The trajectory planner is also configured to generate a route for the AV conforming to the virtual path using points. The trajectory follower is configured to generate control inputs for the AV to follow the route while avoiding nearby static or dynamic objects and while the virtual vehicle forms the second portion of the virtual path.

These and other aspects of the present disclosure are disclosed in the following detailed description of the embodiments, the appended claims, and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings may not be to scale. On the contrary, the dimensions of the various features may be arbitrarily expanded or reduced for clarity. Further, like reference numbers refer to like elements throughout the drawings unless otherwise noted.

FIGS. 6A-6E are screenshots that demonstrate a display for remote support and a route for the AV conforming to a virtual path interfering with an external object.

DETAILED DESCRIPTION

Figure 1:
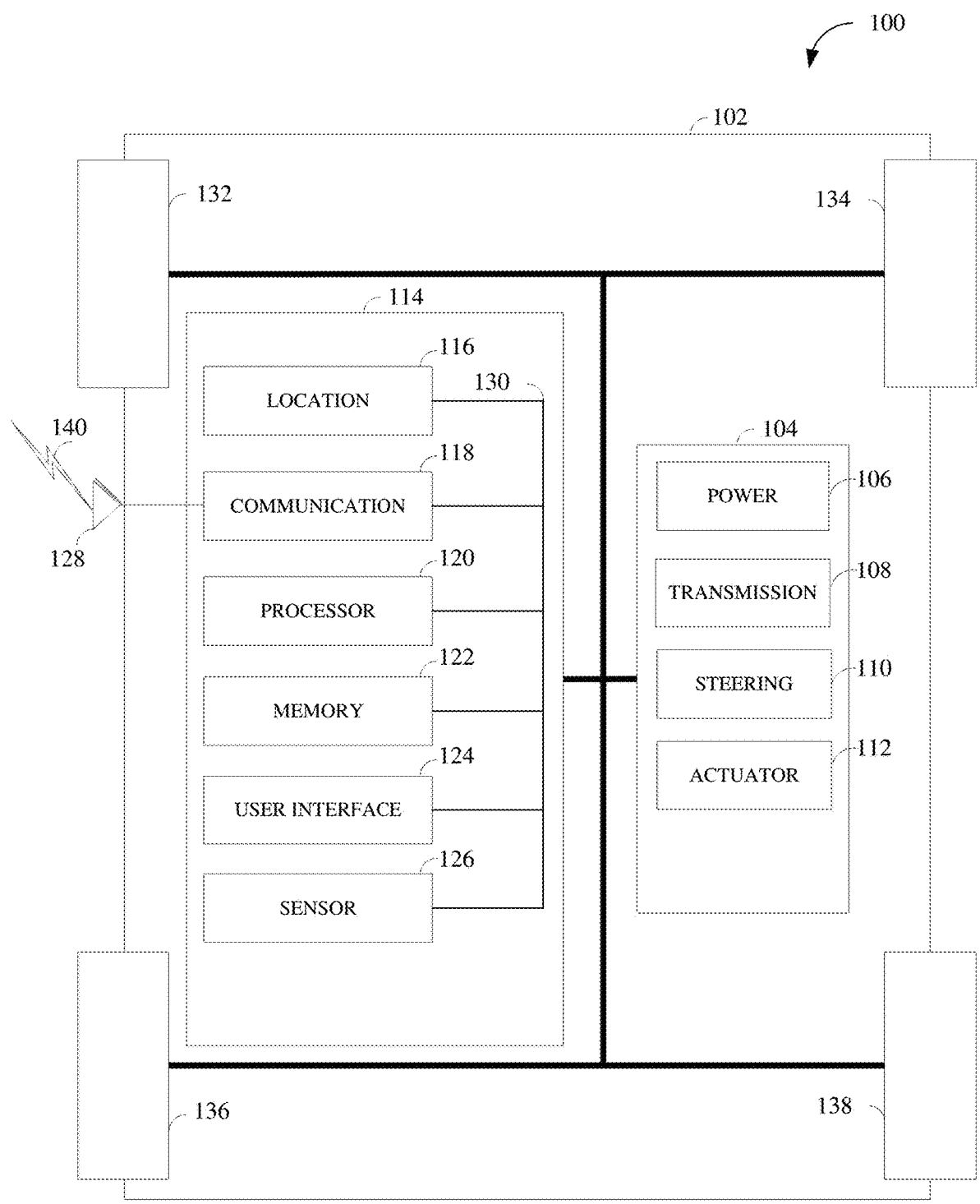
FIG. 1 is a diagram of an example of a portion of a vehicle in which the aspects, features, and elements disclosed herein may be implemented.

A vehicle, such as an autonomous vehicle or a semi-autonomous vehicle, may traverse a portion of a vehicle transportation network. A semi-autonomous vehicle may be one that includes an advanced driver assist system (ADAS). An ADAS can automate, adapt and/or enhance vehicle systems for safety and better driving such as to circumvent and/or correct driver errors. Collectively, autonomous and semi-autonomous vehicles may be referred to as autonomous vehicles (AV) herein. The vehicle transportation network can include one or more unnavigable areas, such as a building; one or more partially navigable areas, such as a parking area (e.g., a parking lot, a parking space, etc.); one or more navigable areas, such as roads (which include lanes, medians, intersections, etc.); or a combination thereof.

The vehicle may include one or more sensors. Traversing the vehicle transportation network may include the sensors generating or capturing sensor data, such as data corresponding to an operational environment of the vehicle, or a portion thereof. For example, the sensor data may include information corresponding to one or more external objects (or simply, objects).

An external object can be a static object. A static object is one that is stationary and is not expected to move in the next few seconds. Examples of static objects include a bike with no rider, a cold vehicle, an empty vehicle, a road sign, a wall, a building, a pothole, etc.

An external object can be a stopped object. A stopped object is one that is stationary but might move at any time. Examples of stopped objects include a vehicle that is stopped at a traffic light and a vehicle on the side of the road with an occupant (e.g., a driver) therein. In some implementations, stopped objects are considered static objects.

An external object can be a dynamic (i.e., moving) object, such as a pedestrian, a remote vehicle, a motorcycle, a bicycle, etc. The dynamic object can be oncoming (toward the vehicle) or can be moving in the same direction as the vehicle. The dynamic object can be moving longitudinally or laterally with respect to the vehicle. A static object can become a dynamic object, and vice versa.

Traversing (e.g., driving within) the vehicle transportation network can be considered a robotic behavior. That is, predictable responses by a vehicle to certain situations (e.g., traffic or road situations) can be anticipated. For example, an observer of a traffic situation can anticipate what the response of a vehicle will be over the next few seconds. That is, for example, while the driving environment (i.e., the vehicle transportation network, the roadways) may be dynamic, the response, such as by a vehicle (i.e., driven by a human, remotely operated, etc.), to a road condition, can be predicted/anticipated.

The response(s) can be predicted because traversing a vehicle transportation network is governed by rules of the road (e.g., a vehicle turning left must yield to oncoming traffic, a vehicle must drive between a lane's markings), by social conventions (e.g., at a stop sign, the driver on the right is yielded to), and physical limitations (e.g., a stationary object does not instantaneously move laterally into a vehicle's right of way).

An AV may, however, encounter a condition or combination of conditions while traveling that cannot be entirely addressed through using its sensors and prediction techniques. That is, for example, conditions may occur that could lead to either unnatural (e.g., uncomfortable, jarring, etc.) driving behavior of the AV or paralysis (e.g., an inability of the algorithms of the AV to resolve and/or react to perceived and/or predicted conflicts). The AV may need to traverse an unmapped geographical area, an unmarked geographical area, or a geographical area that is both unmarked and unmapped. The AV may need to modify its existing path due to construction that would violate its programming, such as by running over a curb, or moving out of a lane. In such instances and others, the AV may request remote assistance. Remote assistance allows for real-time control of the vehicle from a starting point, generally at the time the AV requests assistance, to an ending point, generally after the AV passes back into an area where it no longer requires assistance (e.g., after the obstruction, entering a marked, mapped portion of the vehicle transportation area, etc.).

Such remote assistance (also called teleoperation herein) requires high-bandwidth, low-latency communications for real-time control of the vehicle. Unfortunately, communications with these characteristics cannot be guaranteed for all conditions an AV may encounter. Another alternative is using a remote operator to manually draw a path sent to the AV to be executed. This form of teleoperation can be quite slow as a portion of the path is manually drawn, the vehicle executes the portion, then the next portion is drawn, and so on.

Remote assistance that allows real-time remote driving without a requirement of low-latency, high-bandwidth communications, while assuring the safety of the AV, is desirable. Implementations according to this disclosure describe remote assistance whereby a virtual vehicle is controlled real-time based on imagery, objects, and drivable areas produced by the AV. The virtual vehicle can form, trace, or otherwise generate a virtual path that is continually sent to the AV. The AV can substantially follow the virtual path, using available on-board sensing for safety assurance. In this way, a remote operator is capable of remote driving substantially in real-time while the system is capable of mitigating latency issues with respect to control loops and safety issues related to bandwidth limitations. The substantially real-time teleoperation described may be limited to a maximum AV speed that depends on, for example, the speed of communications and potentially other factors.

To describe some implementations of the teachings herein in greater detail, reference is first made to the environment in which this disclosure may be implemented.

FIG. 1 is a diagram of an example of a portion of a vehicle 100 in which the aspects, features, and elements disclosed herein may be implemented. The vehicle 100 includes a chassis 102, a powertrain 104, a controller 114, wheels 132/134/136/138, and may include any other element or combination of elements of a vehicle. Although the vehicle 100 is shown as including four wheels 132/134/136/138 for simplicity, any other propulsion device or devices, such as a propeller or tread, may be used. In FIG. 1, the lines interconnecting elements, such as the powertrain 104, the controller 114, and the wheels 132/134/136/138, indicate that information, such as data or control signals; power, such as electrical power or torque; or both information and power may be communicated between the respective elements. For example, the controller 114 may receive power from the powertrain 104 and communicate with the powertrain 104, the wheels 132/134/136/138, or both, to control the vehicle 100, which can include accelerating, decelerating, steering, or otherwise controlling the vehicle 100.

The powertrain 104 includes a power source 106, a transmission 108, a steering unit 110, a vehicle actuator 112, and may include any other element or combination of elements of a powertrain, such as a suspension, a drive shaft, axles, or an exhaust system. Although shown separately, the wheels 132/134/136/138 may be included in the powertrain 104.

The power source 106 may be any device or combination of devices operative to provide energy, such as electrical energy, thermal energy, or kinetic energy. For example, the power source 106 includes an engine, such as an internal combustion engine, an electric motor, or a combination of an internal combustion engine and an electric motor, and is operative to provide kinetic energy as a motive force to one or more of the wheels 132/134/136/138. In some embodiments, the power source 106 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 108 receives energy, such as kinetic energy, from the power source 106 and transmits the energy to the wheels 132/134/136/138 to provide a motive force. The transmission 108 may be controlled by the controller 114, the vehicle actuator 112, or both. The steering unit 110 may be controlled by the controller 114, the vehicle actuator 112, or both and controls the wheels 132/134/136/138 to steer the vehicle. The vehicle actuator 112 may receive signals from the controller 114 and may actuate or control the power source 106, the transmission 108, the steering unit 110, or any combination thereof to operate the vehicle 100.

In the illustrated embodiment, the controller 114 includes a location unit 116, an electronic communication unit 118, a processor 120, a memory 122, a user interface 124, a sensor 126, and an electronic communication interface 128. Although shown as a single unit, any one or more elements of the controller 114 may be integrated into any number of separate physical units. For example, the user interface 124 and the processor 120 may be integrated in a first physical unit, and the memory 122 may be integrated in a second physical unit. Although not shown in FIG. 1, the controller 114 may include a power source, such as a battery. Although shown as separate elements, the location unit 116, the electronic communication unit 118, the processor 120, the memory 122, the user interface 124, the sensor 126, the electronic communication interface 128, or any combination thereof can be integrated in one or more electronic units, circuits, or chips.

In some embodiments, the processor 120 includes any device or combination of devices, now-existing or hereafter developed, capable of manipulating or processing a signal or other information, for example optical processors, quantum processors, molecular processors, or a combination thereof. The processor 120 may include one or more special-purpose processors, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, one or more state machines, or any combination thereof. The processor 120 may be operatively coupled with the location unit 116, the memory 122, the electronic communication interface 128, the electronic communication unit 118, the user interface 124, the sensor 126, the powertrain 104, or any combination thereof. For example, the processor may be operatively coupled with the memory 122 via a communication bus 130.

The processor 120 may be configured to execute instructions. Such instructions may include instructions for remote operation, which may be used to operate the vehicle 100 from a remote location, including the operations center. The instructions for remote operation may be stored in the vehicle 100 or received from an external source, such as a traffic management center, or server computing devices, which may include cloud-based server computing devices. Remote operation is described in additional detail below.

The memory 122 may include any tangible non-transitory computer-usable or computer-readable medium capable of, for example, containing, storing, communicating, or transporting machine-readable instructions or any information associated therewith, for use by or in connection with the processor 120. The memory 122 may include, for example, one or more solid state drives, one or more memory cards, one or more removable media, one or more read-only memories (ROM), one or more random-access memories (RAM), one or more registers, one or more low power double data rate (LPDDR) memories, one or more cache memories, one or more disks (including a hard disk, a floppy disk, or an optical disk), a magnetic or optical card, or any type of non-transitory media suitable for storing electronic information, or any combination thereof.

The electronic communication interface 128 may be a wireless antenna, as shown, a wired communication port, an optical communication port, or any other wired or wireless unit capable of interfacing with a wired or wireless electronic communication medium 140.

The electronic communication unit 118 may be configured to transmit or receive signals via the wired or wireless electronic communication medium 140, such as via the electronic communication interface 128. Although not explicitly shown in FIG. 1, the electronic communication unit 118 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 118 and a single one of the electronic communication interface 128, any number of communication units and any number of communication interfaces may be used. In some embodiments, the electronic communication unit 118 can include a dedicated short-range communications (DSRC) unit, a wireless safety unit (WSU), IEEE 802.11p (WiFi-P), or a combination thereof.

The location unit 116 may determine geolocation information, including but not limited to longitude, latitude, elevation, direction of travel, or speed, of the vehicle 100. For example, the location unit includes a global positioning system (GPS) unit, such as a Wide Area Augmentation System (WAAS) enabled National Marine Electronics Association (NMEA) unit, a radio triangulation unit, or a combination thereof. The location unit 116 can be used to obtain information that represents, for example, a current heading of the vehicle 100, a current position of the vehicle 100 in two or three dimensions, a current angular orientation of the vehicle 100, or a combination thereof.

The user interface 124 may include any unit capable of being used as an interface by a person, including any of a virtual keypad, a physical keypad, a touchpad, a display, a touchscreen, a speaker, a microphone, a video camera, a sensor, and a printer. The user interface 124 may be operatively coupled with the processor 120, as shown, or with any other element of the controller 114. Although shown as a single unit, the user interface 124 can include one or more physical units. For example, the user interface 124 includes an audio interface for performing audio communication with a person, and a touch display for performing visual and touch-based communication with the person.

The sensor 126 may include one or more sensors, such as an array of sensors, which may be operable to provide information that may be used to control the vehicle. The sensor 126 can provide information regarding current operating characteristics of the vehicle or its surroundings. The sensor 126 includes, for example, a speed sensor, acceleration sensors, a steering angle sensor, traction-related sensors, braking-related sensors, or any sensor, or combination of sensors, that is operable to report information regarding some aspect of the current dynamic situation of the vehicle 100.

In some embodiments, the sensor 126 includes sensors that are operable to obtain information regarding the physical environment surrounding the vehicle 100. For example, one or more sensors detect road geometry and obstacles, such as fixed obstacles, vehicles, cyclists, and pedestrians. The sensor 126 can be or include one or more video cameras, laser-sensing systems, infrared-sensing systems, acoustic-sensing systems, or any other suitable type of on-vehicle environmental sensing device, or combination of devices, now known or later developed. The sensor 126 and the location unit 116 may be combined.

Although not shown separately in FIG. 1, the vehicle 100 may include a trajectory controller. For example, the controller 114 may include a trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller outputs signals operable to control the vehicle 100 such that the vehicle 100 follows the trajectory that is determined by the trajectory controller. For example, the output of the trajectory controller can be an optimized trajectory that may be supplied to the powertrain 104, the wheels 132/134/136/138, or both. The optimized trajectory can be a control input, such as a set of steering angles, with each steering angle corresponding to a point in time or a position. The optimized trajectory can be one or more paths, lines, curves, or a combination thereof. The trajectory controller is described in additional detail below with regards to FIG. 3.

One or more of the wheels 132/134/136/138 may be a steered wheel, which is pivoted to a steering angle under control of the steering unit 110; a propelled wheel, which is torqued to propel the vehicle 100 under control of the transmission 108; or a steered and propelled wheel that steers and propels the vehicle 100.

A vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

Figure 2:
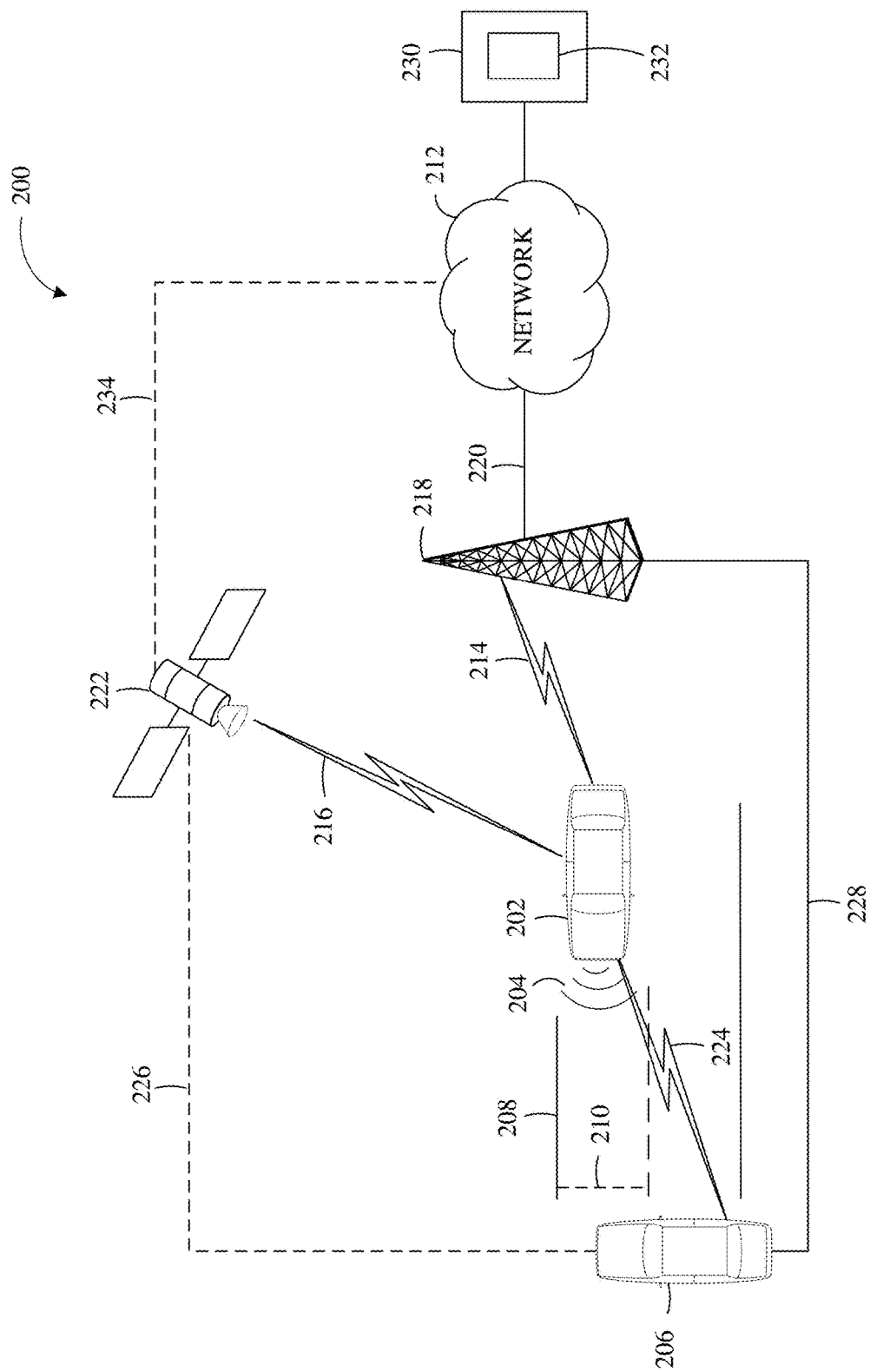
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 200 in which the aspects, features, and elements disclosed herein may be implemented. The vehicle transportation and communication system 200 includes a vehicle 202, such as the vehicle 100 shown in FIG. 1, and one or more external objects, such as an external object 206, which can include any form of transportation, such as the vehicle 100 shown in FIG. 1, a pedestrian, cyclist, as well as any form of a structure, such as a building. The vehicle 202 may travel via one or more portions of a transportation network 208, and may communicate with the external object 206 via one or more of an electronic communication network 212. Although not explicitly shown in FIG. 2, a vehicle may traverse an area that is not expressly or completely included in a transportation network, such as an off-road area. In some embodiments, the transportation network 208 may include one or more of a vehicle detection sensor 210, such as an inductive loop sensor, which may be used to detect the movement of vehicles on the transportation network 208.

The electronic communication network 212 may be a multiple access system that provides for communication, such as voice communication, data communication, video communication, messaging communication, or a combination thereof, between the vehicle 202, the external object 206, and an operations center 230. For example, the vehicle 202 or the external object 206 may receive information, such as information representing the transportation network 208, from the operations center 230 via the electronic communication network 212.

The operations center 230 includes a controller apparatus 232, which includes some or all of the features of the controller 114 shown in FIG. 1. The controller apparatus 232 can monitor and coordinate the movement of vehicles, including autonomous vehicles. The controller apparatus 232 may monitor the state or condition of vehicles, such as the vehicle 202, and external objects, such as the external object 206. The controller apparatus 232 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 232 can establish remote control over one or more vehicles, such as the vehicle 202, or external objects, such as the external object 206. In this way, the controller apparatus 232 may teleoperate the vehicles or external objects from a remote location. The controller apparatus 232 may exchange (send or receive) state data with vehicles, external objects, or a computing device, such as the vehicle 202, the external object 206, or any other device within the vehicle transportation and communication system 200, via a wireless communication link, such as the wireless communication link 226, or a wired communication link, such as the wired communication link 228.

In some embodiments, the vehicle 202 or the external object 206 communicates via the wired communication link 228, a wireless communication link 214/216/224, or a combination of any number or types of wired or wireless communication links. For example, as shown, the vehicle 202 or the external object 206 communicates via a terrestrial wireless communication link 214, via a non-terrestrial wireless communication link 216, or via a combination thereof. In some implementations, a terrestrial wireless communication link 214 includes an Ethernet link, a serial link, a Bluetooth link, an infrared (IR) link, an ultraviolet (UV) link, or any link capable of electronic communication.

A vehicle, such as the vehicle 202, or an external object, such as the external object 206, may communicate with another vehicle, external object, or the operations center 230. For example, a host, or subject, vehicle 202 may receive one or more automated inter-vehicle messages, such as a basic safety message (BSM), from the operations center 230 via a direct communication link 224 or via an electronic communication network 212. For example, the operations center 230 may broadcast the message to host vehicles within a defined broadcast range, such as three hundred meters, or to a defined geographical area. In some embodiments, the vehicle 202 receives a message via a third party, such as a signal repeater (not shown) or another remote vehicle (not shown). In some embodiments, the vehicle 202 or the external object 206 transmits one or more automated inter-vehicle messages periodically based on a defined interval, such as one hundred milliseconds.

The vehicle 202 may communicate with the electronic communication network 212 via an access point 218. The access point 218, which may include a computing device, is configured to communicate with the vehicle 202, with the electronic communication network 212, with the operations center 230, or with a combination thereof via wired or wireless communication links 214/220. For example, an access point 218 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 202 may communicate with the electronic communication network 212 via a satellite 222 or other non-terrestrial communication device. The satellite 222, which may include a computing device, may be configured to communicate with the vehicle 202, with the electronic communication network 212, with the operations center 230, or with a combination thereof via one or more communication links 216/234. Although shown as a single unit, a satellite can include any number of interconnected elements.

The electronic communication network 212 may be any type of network configured to provide for voice, data, or any other type of electronic communication. For example, the electronic communication network 212 includes a local area network (LAN), a wide area network (WAN), a virtual private network (VPN), a mobile or cellular telephone network, the Internet, or any other electronic communication system. The electronic communication network 212 may use a communication protocol, such as the Transmission Control Protocol (TCP), the User Datagram Protocol (UDP), the Internet Protocol (IP), the Real-time Transport Protocol (RTP), the Hyper Text Transport Protocol (HTTP), or a combination thereof. Although shown as a single unit, an electronic communication network can include any number of interconnected elements.

The vehicle 202 can communicate with the operations center 230 via the electronic communication network 212, the access point 218, or the satellite 222. The operations center 230 may include one or more computing devices, which are able to exchange (send or receive) data from a vehicle, such as the vehicle 202; data from external objects, including the external object 206; or data from any computing device within the vehicle transportation and communication system 200.

In some embodiments, the vehicle 202 identifies a portion or condition of the transportation network 208. For example, the vehicle 202 may include one or more on-vehicle sensors 204, such as the sensor 126 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 208.

The vehicle 202 may traverse one or more portions of the transportation network 208 using information communicated via the electronic communication network 212, such as information representing the transportation network 208, information identified by one or more on-vehicle sensors 204, or a combination thereof. The external object 206 may be capable of all or some of the communications and actions described above with respect to the vehicle 202.

For simplicity, FIG. 2 shows the vehicle 202 as the host vehicle, the external object 206, the transportation network 208, the electronic communication network 212, and the operations center 230. However, any number of vehicles, networks, or computing devices may be used. In some embodiments, the vehicle transportation and communication system 200 includes devices, units, or elements not shown in FIG. 2.

Although the vehicle 202 is shown communicating with the operations center 230 via the electronic communication network 212, the vehicle 202 (and the external object 206) may communicate with the operations center 230 via any number of direct or indirect communication links. For example, the vehicle 202 or the external object 206 may communicate with the operations center 230 via a direct communication link, such as a Bluetooth communication link. Although, for simplicity, FIG. 2 shows one of the transportation network 208 and one of the electronic communication network 212, any number of networks or communication devices may be used.

The external object 206 is illustrated as a second, remote vehicle in FIG. 2. An external object is not limited to another vehicle. An external object may be another object or any infrastructure element, for example, a fence, a sign, a building, etc., that has the ability transmit data to the operations center 230. Data communicated to the operations center 230 may be, for example, sensor data from an infrastructure element.

Figure 3:
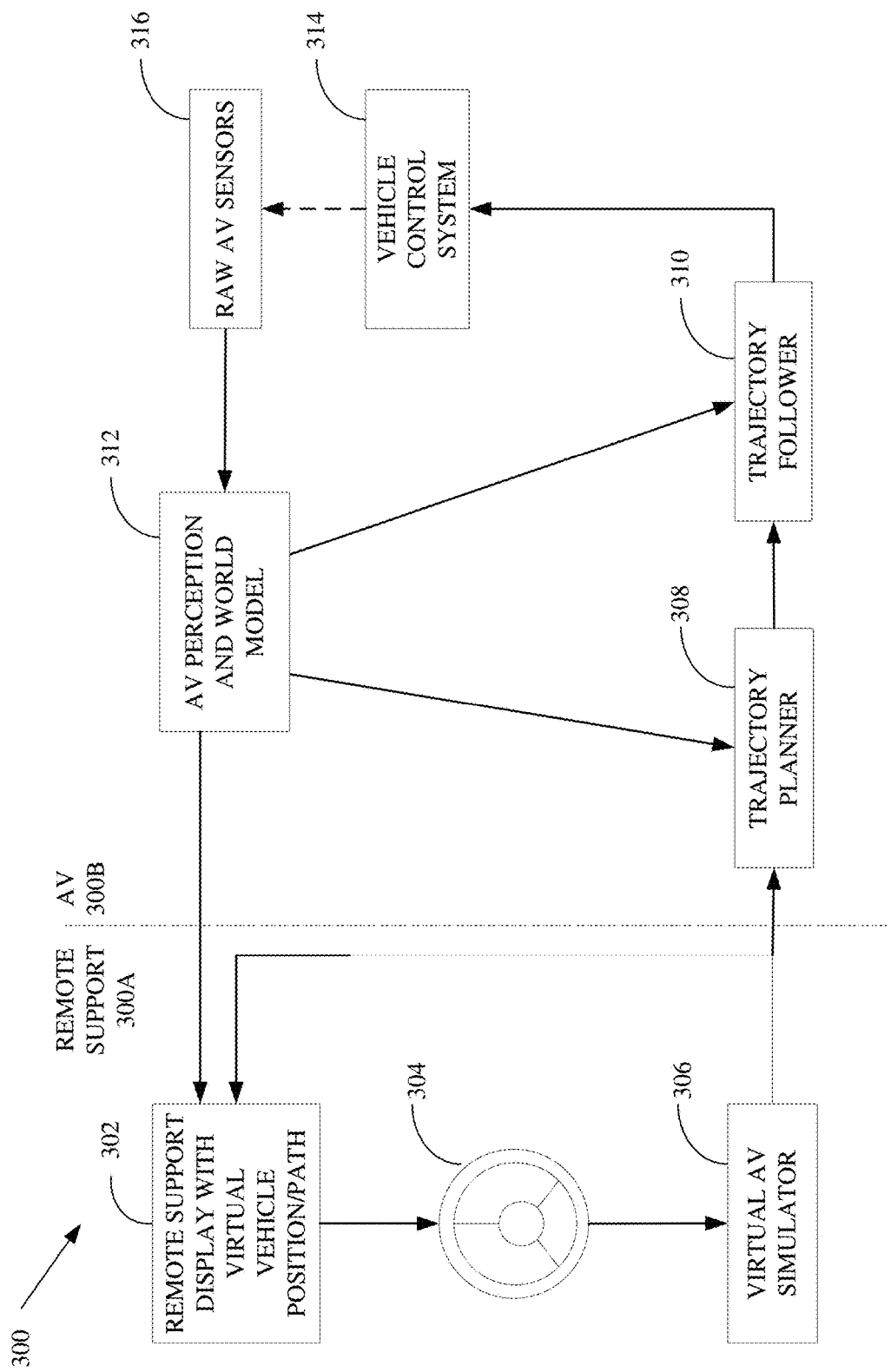
FIG. 3 is a diagram of a system for traveling through a transportation network according to implementations of this disclosure.

FIG. 3 is a diagram of a system 300 for traveling through a transportation network according to an implementation of the teachings herein. FIG. 3 shows one example of components of the system 300, but others are possible as noted below. The system 300 as shown comprises remote support 300A and an AV 300B. The remote support 300A may be implemented by the operations center 230, in an example. The AV 300B may be implemented by any autonomous or semi-autonomous vehicle such as the AV 100 or the AV 202. The remote support 300A may supply route assistance to the AV 300B.

The system 300 includes a communication device and a processor. The system 300 may include more than one communication device, more than one processor, or both. For example, the remote support 300A of the system 300 may include a processor or other computing apparatus, such as the controller apparatus 232 shown in FIG. 2. The remote support 300A may include any wired or wireless communication device in connection with the processor and capable of communicating with elements of the vehicle transportation and communication system 200 through, e.g., the electronic communication network 212. For example, the remote support 300A may include a processor, such as the processor 120 described above with regards to FIG. 1, and a communication device, such as the electronic communication unit 118 also described above with regards to FIG. 1.

The remote support 300A of the system 300 includes a remote support display 302, a human-machine interface 304, and a virtual AV simulator 306, which may be implemented by a communication device and a processor. The processor may perform a method including generating the display 302.

The display 302 includes a geographical area about a starting location for route assistance for the AV through a transportation network, such as the transportation network 208 described with regards to FIG. 2. The display 302 also includes a virtual vehicle at the starting location. As discussed in more detail below, the display 302 may be generated by receiving images from the AV and including, in the display 302, objects and drivable areas derived from the images. The remote support 300A may be activated (i.e., started, initiated) by receiving, for the AV, a request for the route assistance through the transportation network.

The request may be received by the communication device, e.g., from the AV or an operator or passenger of the AV). The request may include the starting location. Alternatively, the starting location may be retrieved from the AV as the present location of the AV at the time the request is received or shortly thereafter (e.g., at the next sampling interval for data from the AV). The request may optionally include the ending location for the route assistance. The ending location may be alternatively or additionally identified by another message, signal, or communication received by the communication device, such as during the route assistance. The ending location may be determined by the remote support 300A. For example, the request may include a request for route assistance through an unmapped portion of the transportation network 208, and may include the location (i.e., the starting location) where the unmapped portion adjoins (e.g., enters) a mapped portion of the transportation network 208. The ending location may be determined by the remote support 300A as another mapped portion of the transportation network 208 that adjoins (e.g., exits) the unmapped portion.

The method can also include forming a virtual path for the route assistance using the virtual vehicle. Forming a virtual path may be described in additional detail with reference to FIGS. 4A-4F, which are diagrams that simulate forming a virtual path using a virtual vehicle.

Figure 4A:
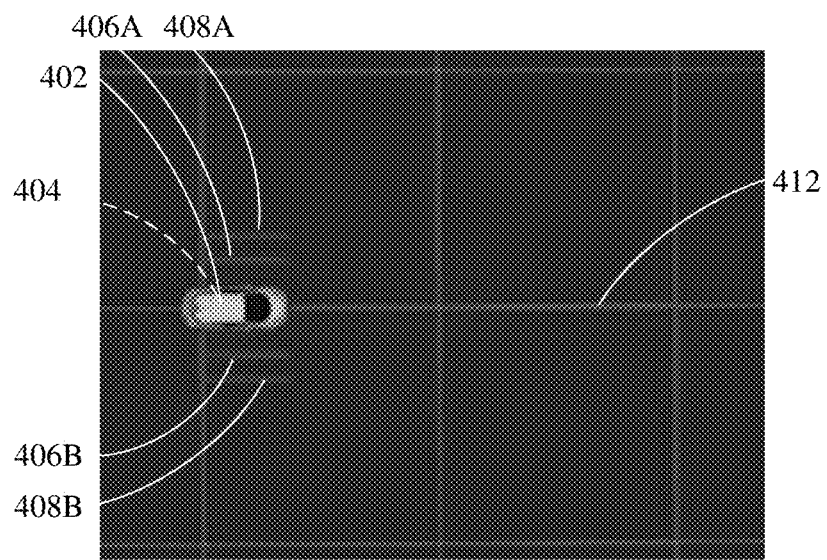
FIGS. 4A-4F are diagrams that simulate forming a virtual path using a virtual vehicle.
Figure 4B:
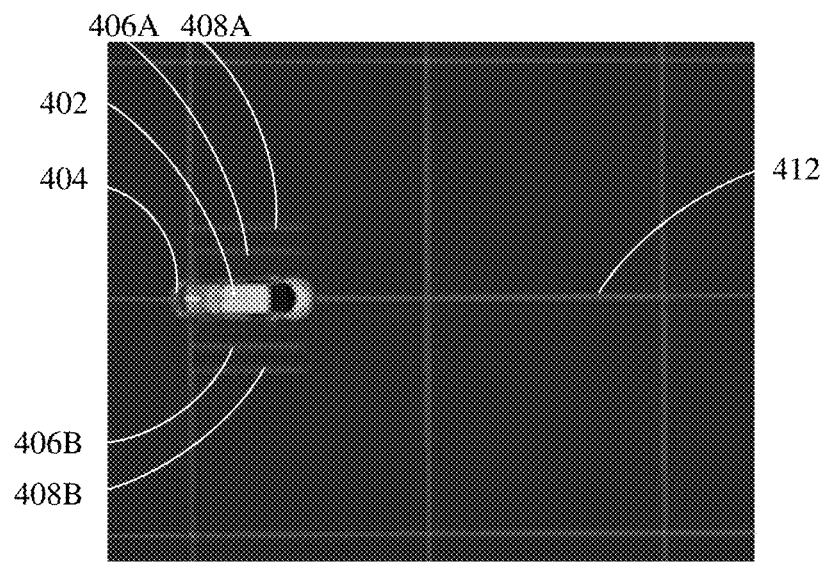
Figure 4C:
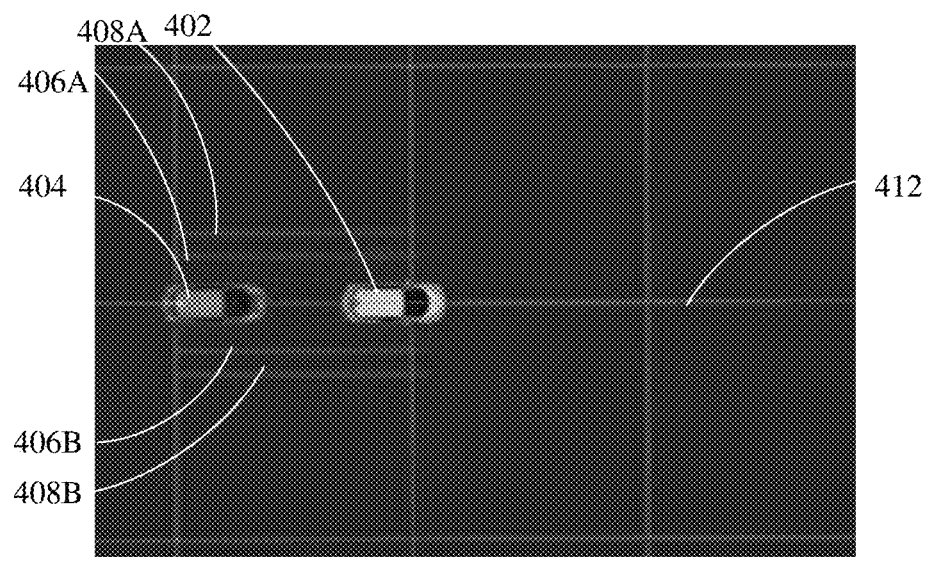
Figure 4D:
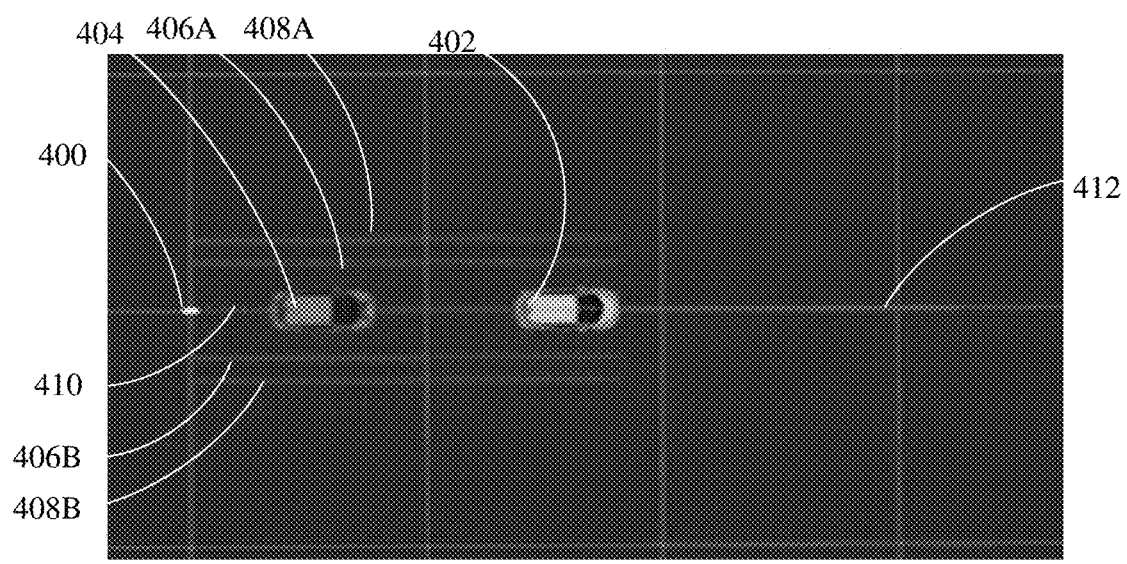
Figure 4E:
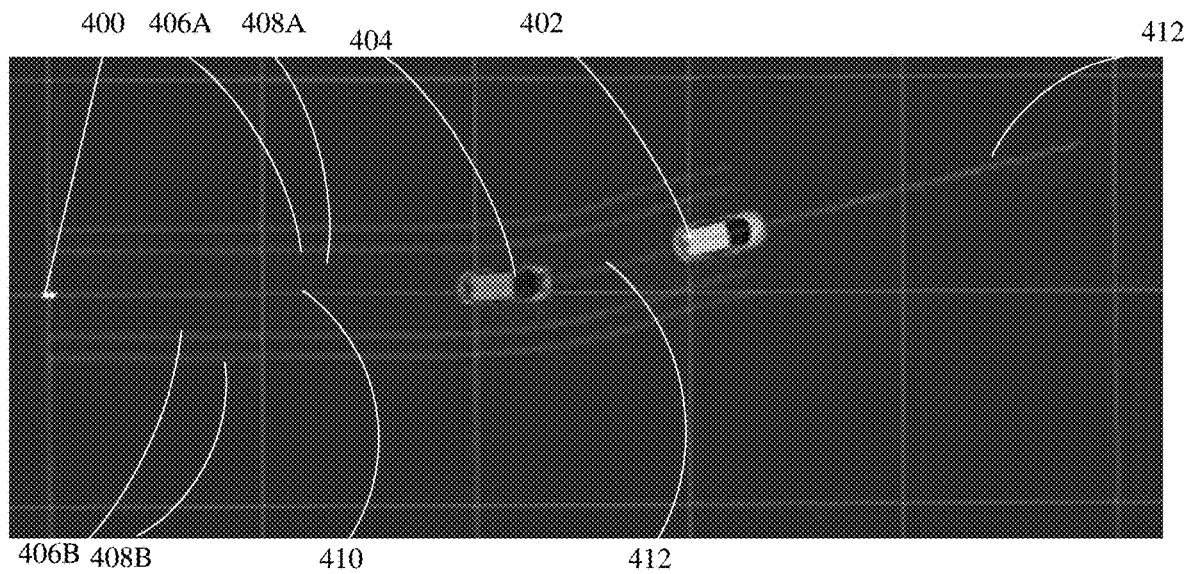
Figure 4F:
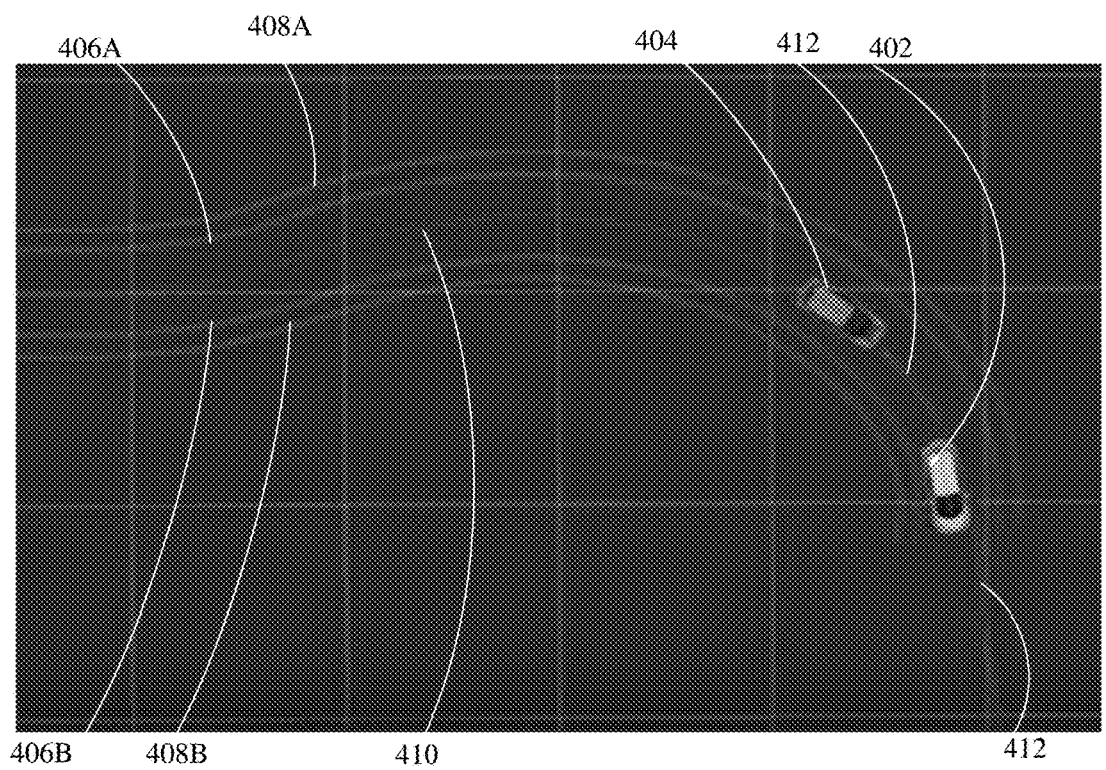
Figure 5A:
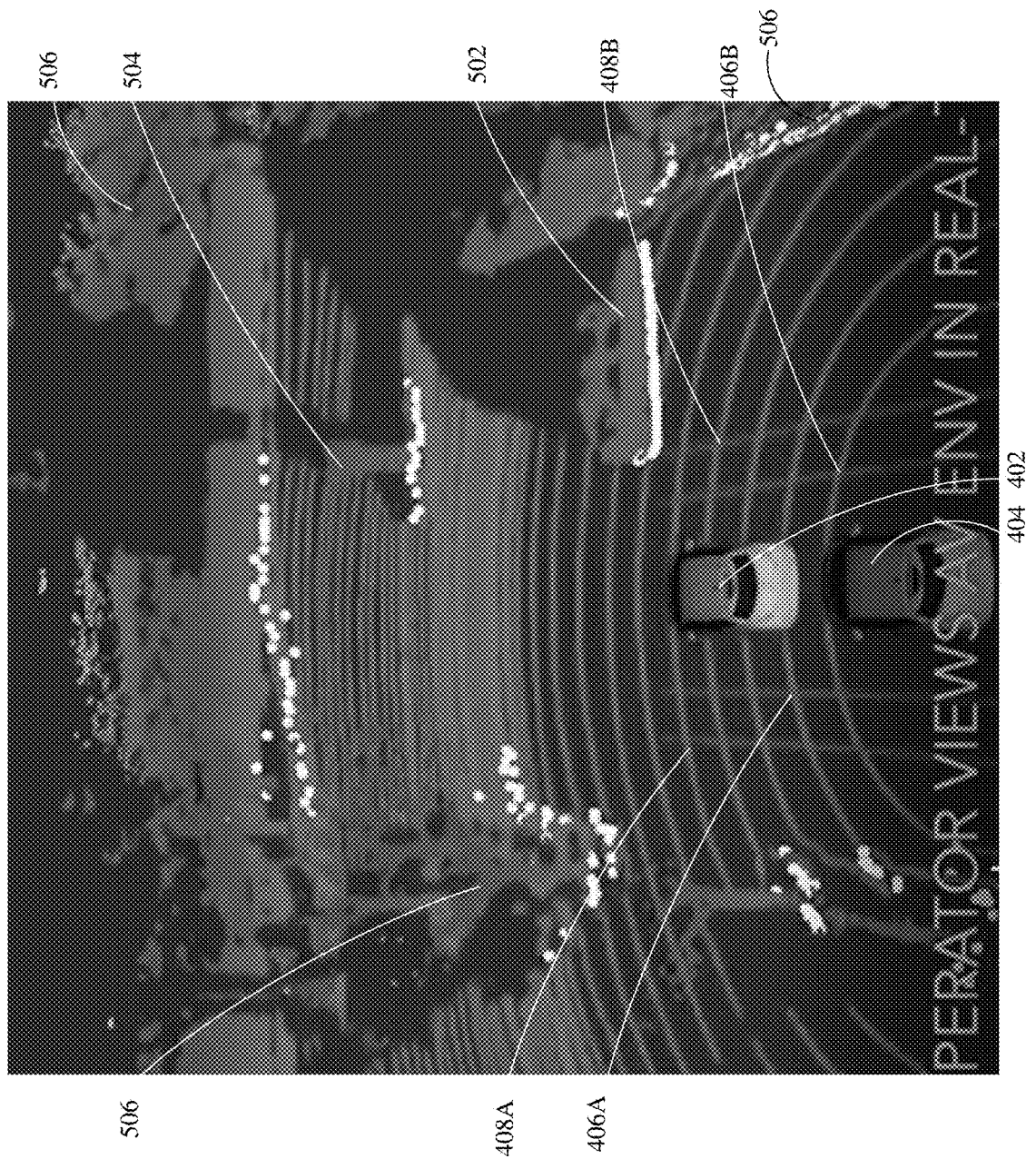
FIGS. 5A-5F are screenshots that demonstrate a display for remote support and a route for the AV conforming to a virtual path that avoids external objects.
Figure 5B:
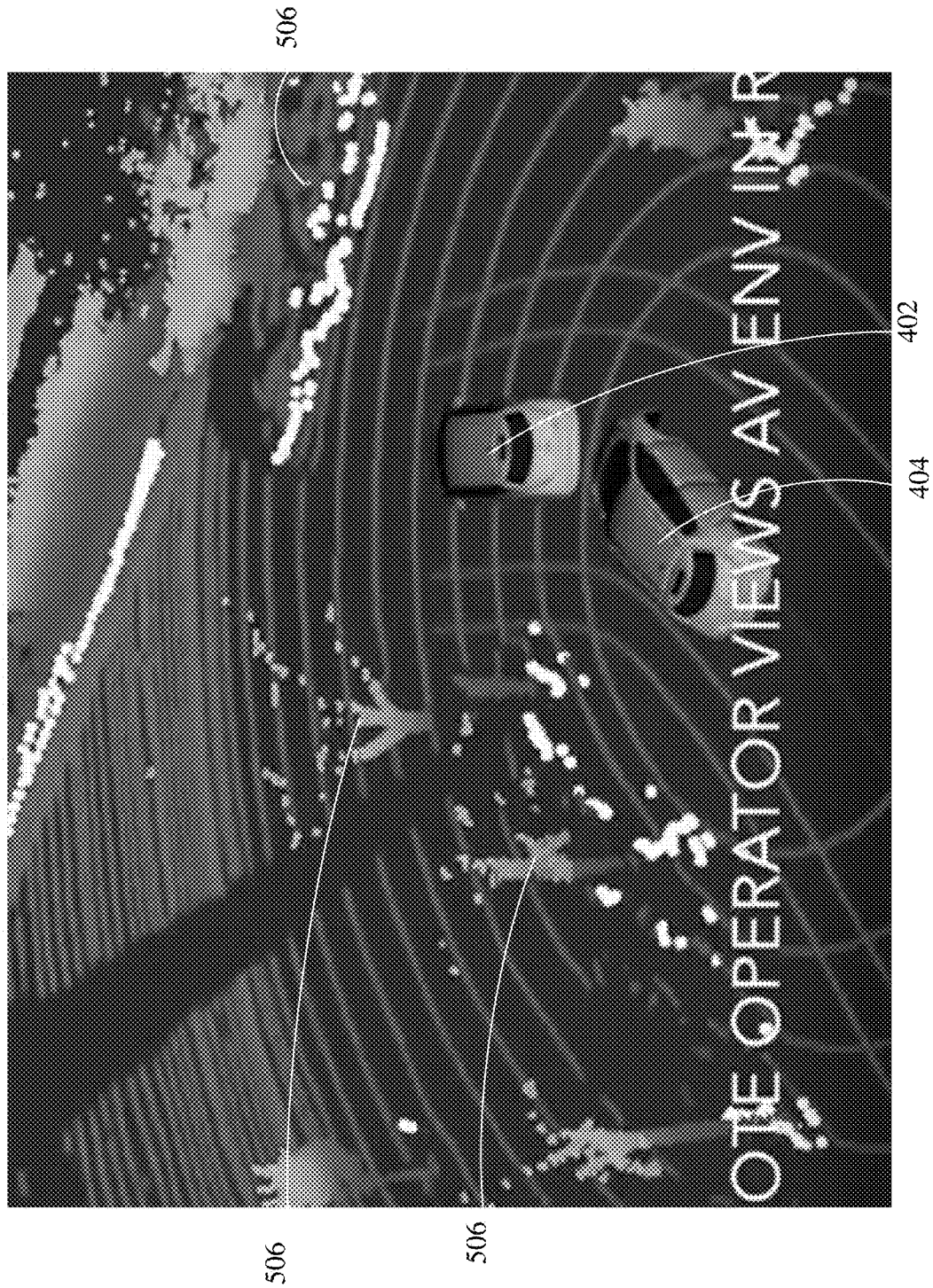
Figure 5C:
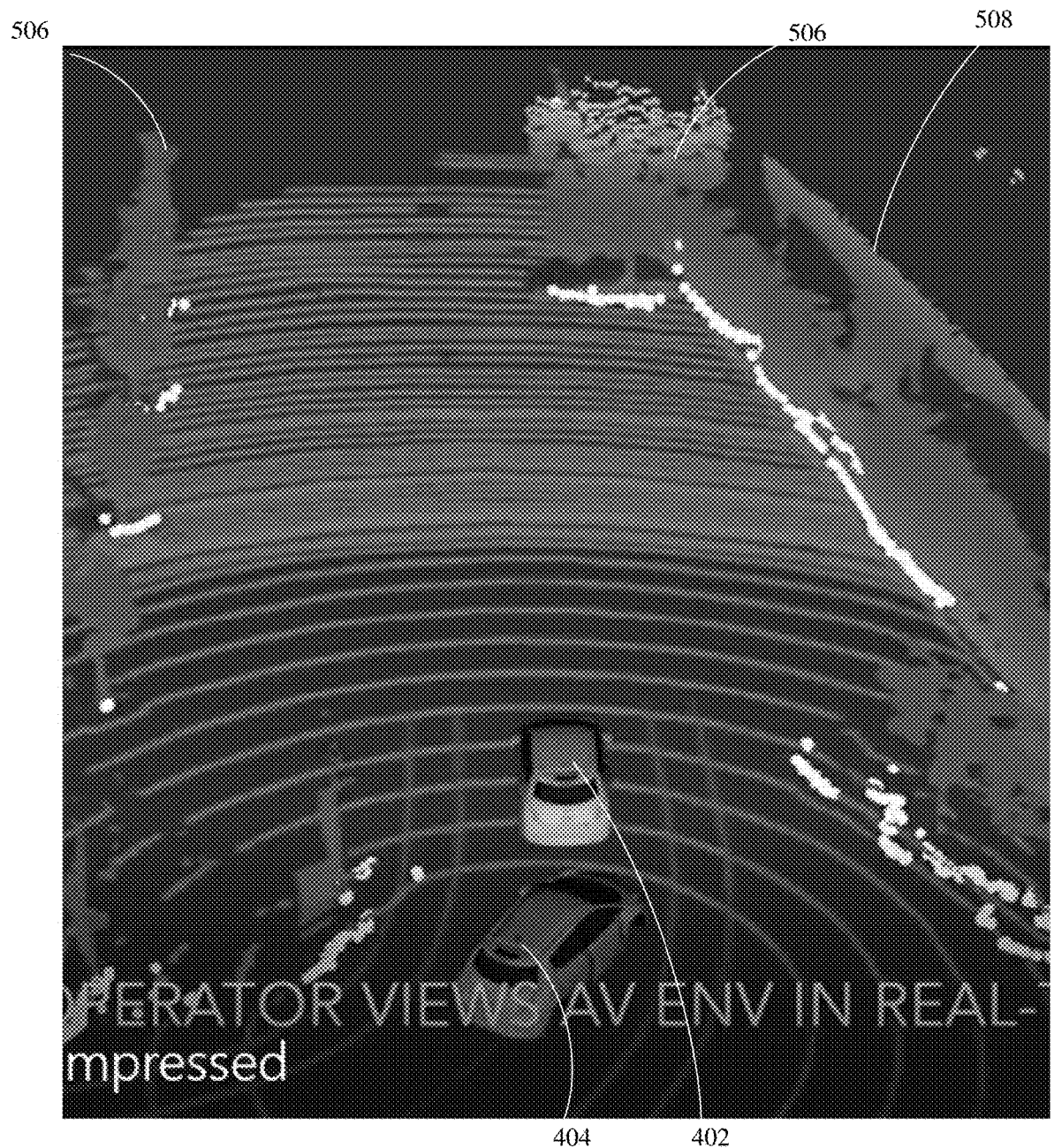
Figure 5D:
Figure 5E:
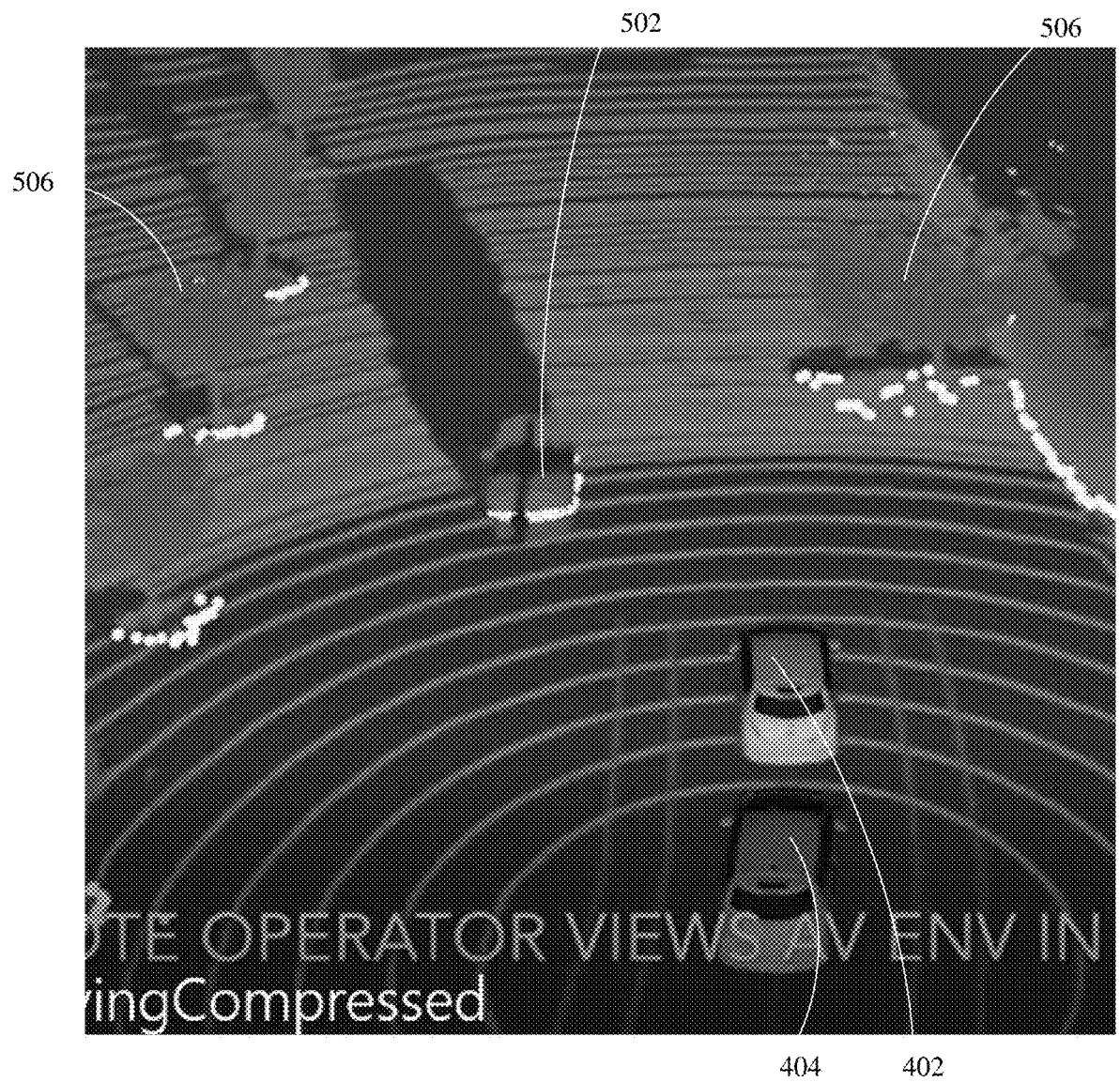
Figure 5F:
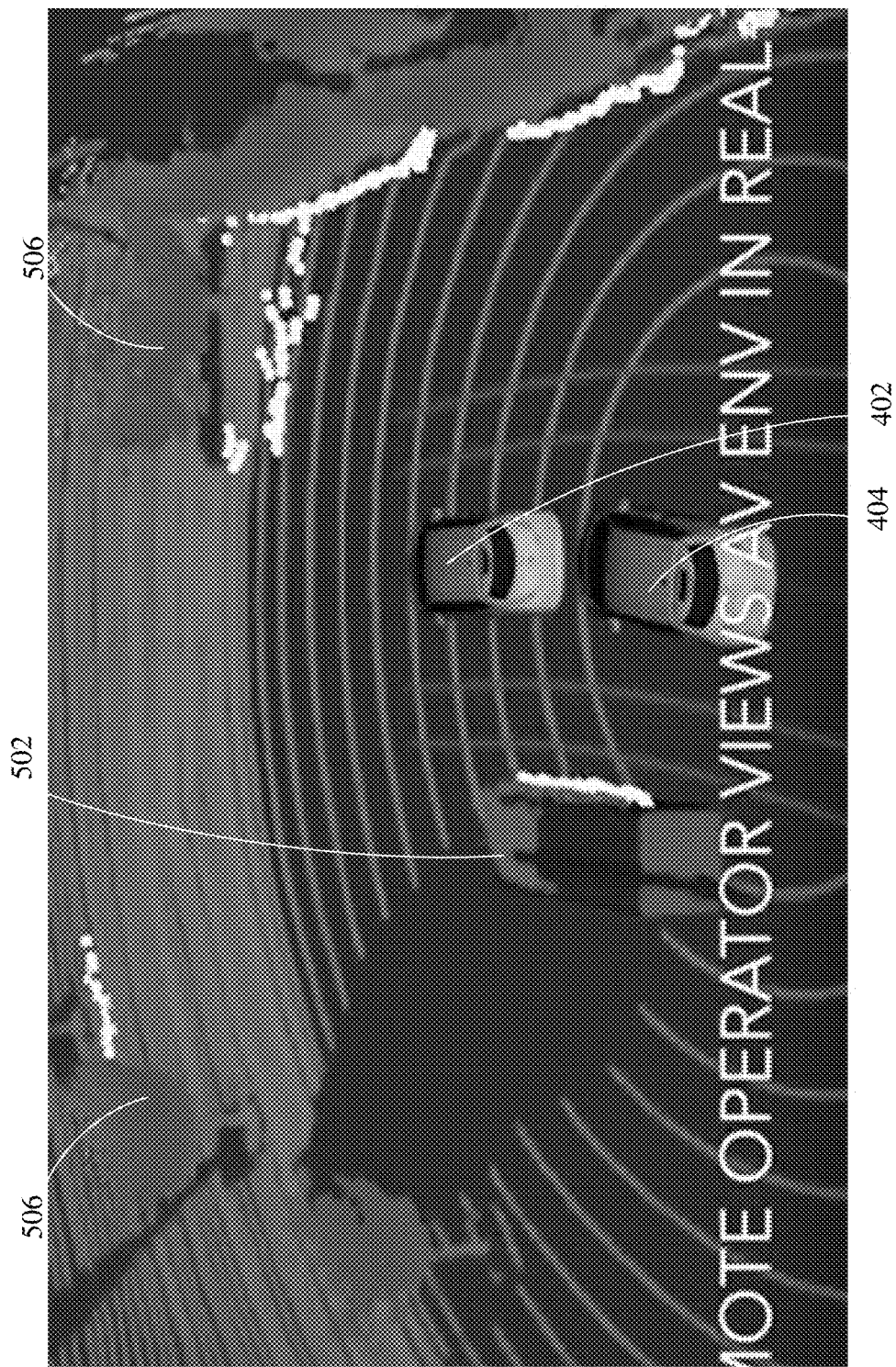

In FIG. 4A, the virtual vehicle 402 is at the starting location 400 (best seen in FIGS. 4D and 4E). The AV 404 is co-located with the virtual vehicle 402 at the starting location 400 in this example, but the AV 404 may be omitted from a display. Whether or not the AV 404 is displayed, the virtual vehicle 402 is desirably at the same pose as the AV 404 at the starting location 400. A left border and a right border laterally extend along the left and right sides of the virtual vehicle 402. The left border and the right border may be a defined distance from the left and right sides of the AV 404. The defined distance may be based on a desired clearance of the AV 404 from likely external objects. For example, a door of a parked vehicle can open. As the maximum size of a car door is approximately 1 meter, the defined distance between the virtual vehicle 402 and each of the left and right borders may be 1 meter. The defined distance may be based on driver or operator spacing tolerance. The defined distance may vary, such as to take into account the presence of external objects. For example, the defined distance may be a first value when no external objects are present in the display 302, and may be a second value smaller than the first value when an external object is present in the display 302. The left border and the right border may be spaced apart from the virtual vehicle 402, and hence the AV 404, by different distances (e.g., where there is an external object to one side of the AV 404, but not the other, or where there are two different external objects on opposite sides of the AV 404 that result in two different defined distances).

More than one left border and more than one right border may be used. As shown in the example of FIGS. 4A-4F, the left border and the right border comprise an inner left border 406A and an inner right border 406B, and an outer left border 408A and an outer right border 408B. The inner left and right borders 406A, 406B are a first distance from the AV 404, and the outer left and right borders 408A, 408B are a second distance from the AV 404 that is larger than the first distance. The first distance and the second distance may conform to one or more of the possible defined distances above. For example, the first distance may be based on the driver or operator spacing tolerance (e.g., the comfort level of the driver or operator with passing near external objects), while the second distance is based on the maximum size of a car door. In this way, for example, the inner left and right borders 406A, 408A may define soft boundaries, and the outer left and right borders 406B, 408B may define hard boundaries. A hard boundary is such that, if the route 412 discussed below were to cross the hard boundary, a collision with another object may be possible. On the other hand, a soft boundary is such that, if the route 412 were to cross the soft boundary, the resulting motion of the AV may be unlawful and/or uncomfortable, but a collision is unlikely.

A first portion of the virtual path 410 is obtained from advancing the virtual vehicle 402 from the starting location 400 of the AV 404. This may be seen by reference to FIGS. 4B-4D. In FIG. 4B, the virtual vehicle 402 advances from the starting location 400. At this time, the AV 404 may remain at the starting location 400. The virtual vehicle 402 further advances as shown in FIG. 4C, extending the length of the first portion of the virtual path 410 and becoming more spaced from the AV 404 when at the starting location 400. The first portion of the virtual path 410 may be obtained by, while advancing the virtual vehicle 402, recording the path taken by the virtual vehicle 402. The recording may be performed at defined intervals. Recording the path may include recording the pose of the virtual vehicle 402, in addition to the position at each point.

A second portion of the virtual path 410 is obtained from, after the virtual vehicle 402 departs from the starting location 400, extrapolating from the virtual vehicle 402 through the geographical area in which the AV 404 is located, according to the desired route assistance. The second portion of the virtual path 410 can extend from the end of the first portion to a stopping location or an ending location of the route assistance. A stopping location is a temporary stop when traveling to the ending location, such as an intersection or another temporary stop. In some cases, the second portion may be based on a (e.g., constant) deceleration to a stationary position (i.e., the stopping location or the ending location) in consideration of the pose and velocity of the virtual vehicle, such as the virtual vehicle 402. The extrapolation from the virtual vehicle 402 may be performed at the same defined intervals as used to record the path of the virtual vehicle 402 to obtain the first portion of the virtual path 410 such that the start of each extrapolation is the pose of the virtual vehicle 402 at the current point.

At some point, and as shown in FIG. 4D, the virtual path comprising the recorded (i.e., first) and extrapolated (i.e., second) portions is sufficiently long enough for the AV 404 to follow. The virtual path may be sufficiently long when it meets (e.g., comprises, satisfies, equals, etc.) a defined amount. The defined amount may be a distance, an amount of time taken for the virtual vehicle to travel along the virtual path, or a combination of these values. The defined amount may vary with the simulated speed, acceleration and/or deceleration of the virtual vehicle 402. For example, the defined amount may decrease with a higher speed, and increase with a slower speed.

To control the virtual vehicle 402, the remote support 300A may include a simulator including an interface configured to receive input from a user defining the virtual path 410, the simulator providing output corresponding to the virtual path 410 to the processor for generating the display, such as the display 302. The user may be located at the location of the remote support 300A. Referring back to FIG. 3, the interface may comprise the human-machine interface 304 that provides the input to the virtual AV simulator 306. The human-machine interface 304 may comprise components that provide input signals to simulate directional changes, as well as the start, stop, acceleration, and deceleration of the virtual vehicle 402. For example, the human-machine interface 304 may include a steering wheel (as shown by example) or a joystick to control the direction of the virtual vehicle 402. The human-machine interface 304 may include an accelerator pedal for starting and accelerating the virtual vehicle 402. The human-machine interface 304 may include a brake pedal for decelerating and stopping the virtual vehicle 402. The human-machine interface 304 may include optional component, such as a clutch, a gear shift, etc. Other components described with regards to the vehicle 100 may be incorporated into the human-machine interface 304.

The human-machine interface 304 continually transmits input signals corresponding to control by the user to the virtual AV simulator 306 through any wired or wireless connection. The input signals may be transmitted continuously. The input signals may be transmitted periodically, such as every 1 ms or at some other rate. The virtual AV simulator 306 receives input from a user defining the virtual path 410 using the human-machine interface 304. The output from the virtual AV simulator 306 corresponds to the virtual path 410 (e.g., as location points). The remote support 300A continually transmits, e.g., via the communication device, points along the virtual path 410 to a trajectory planner of an AV while the virtual vehicle advances through the geographical area. Referring again to FIG. 3, and as discussed in additional detail below, the trajectory planner 308 uses the input from the virtual AV simulator 306, and generates a route for the AV, such as the AV 404, conforming to the virtual path 410. Continually transmitting the points may comprise periodically transmitting the points. The points and other locations described herein may be identified as GPS coordinates, three-dimensional (3D) Cartesian coordinates, etc.

In this manner, the display such as the display 302 is generated. In the example of FIGS. 4A-4F, generating the display includes generating a representation of the AV 404 at the starting location 400, and continually updating representations of the virtual vehicle 402 and the virtual path 410 extending from the AV 404 to a current location of the virtual vehicle 402 (e.g., the first portion based on the recorded virtual vehicle 402 data), and extending from the virtual vehicle 402 to the end of the virtual path 410 (e.g., the second portion based on the extrapolated points based on the pose of the virtual vehicle 402 at the current location). Representations of the virtual vehicle 402 in the display are continually updated while the virtual vehicle 402 advances through the geographical area. As explained below, sensor data from the AV related to the route is also available to the remote support 300A so that, within the display 302, representations of the AV 404 are also continually updated while the AV 404 advances along the route behind the virtual vehicle 402 relative to (e.g., the direction of travel along) the virtual path 410.

A route 412 generated for the AV by the trajectory planner 308 that conforms to the virtual path 410 is shown by example in each of FIGS. 4A-4F. As can be seen more clearly in FIGS. 4E and 4F, the route 412 is formed of trajectories calculated using the virtual path 410. This is explained in more detail with regards to the description of the AV 300B of the system 300.

Referring again to FIG. 3, the AV 300B of the system 300 can include a trajectory planner 308, a trajectory follower 310, AV perception and world model 312, the vehicle control system 314, and raw AV sensors 316, each of which may be implemented at least in part by a communication device and a processor. The processor, such as the processor 120, can transmit, via the communication device, a request for route assistance through the transportation network. The request, transmitted to the remote support 300A, can include the starting location, or the starting location can be subsequently transmitted as described above with regards to the description of the remote support 300A. The trajectory planner 308 and the trajectory follower 310 of FIG. 3 may together implement the trajectory controller described above with regards to FIG. 1, in order to remotely control or assist the AV 300B responsive to the request.

The trajectory planner 308 of the AV 300B can continually receive, through the communication device, points along the virtual path, such as the virtual path 410, for route assistance through the transportation network. The trajectory planner 308 can generate a route, such as the route 412, for the AV 300B conforming to the virtual path using the points. The route may comprise a trajectory for the AV 300B. For example, the trajectory planner 308 determines a next-few-seconds trajectory. As such, and in an example where the next few seconds are the next 6 seconds (i.e., a look-ahead time of 6 seconds), the trajectory planner 308 determines a trajectory and locations for the AV in the next 6 seconds from its existing (or current) location. The trajectory or route 412, as can be seen by example in FIGS. 4E and 4F, may be generated for the portion of the geographical area or transportation network that corresponds to the virtual path between the existing location of the AV 300B, such as the AV 404, and the virtual vehicle, such as the virtual vehicle 402. In addition, the trajectory or route 412 may be generated for a portion of the geographical area or transportation network that extends beyond the existing location of the virtual vehicle, such as the virtual vehicle 402. For example, the trajectory planner 308 may determine (e.g., predict, calculate, etc.) the expected locations of the AV at several time intervals (e.g., every one-quarter of a second, or some other time interval) using the points of the virtual path as input. The route may comprise a desired/smooth trajectory that is generated based on currently perceived lateral and longitudinal constraints. In an example, the trajectory planner 308 uses a model predictive control (MPC) method to generate the trajectory.

The trajectory planner 308 may receive inputs other than the virtual path 410 to generate the route 412. For example, the trajectory planner 308 may receive inputs from the AV perception and world model 312 as described in additional detail below. The trajectory planner 308 may receive input in the form of instructions or rules regarding how to generate the route 412, how to generate control inputs using the trajectory follower 310, or both. The instructions or rules may be transmitted from the virtual AV simulator 306 via the communication device or devices. Examples of instructions or rules are described below with reference to FIGS. 5A-7.

The trajectory follower 310 is configured to generate control inputs to AV 300B to follow the route 412 while (e.g., the second portion of) the virtual path 410 is being formed. Under such circumstances, the virtual vehicle 402 is advancing through the geographical area (i.e., as shown on the display, such as the display 302). The control inputs may be provided to the vehicle control system 314 of the vehicle 300B. The vehicle control system 314 may include components of the vehicle 300B that control the start, stop, acceleration, deceleration, and direction of the vehicle 300B, such as the components of the powertrain 104 as described with regards to FIG. 1.

The input to the trajectory follower 310 includes the route from the trajectory planner 308, such as the route 412. The input to the trajectory follower 310 may also include instructions or rules from the virtual AV simulator 306, or inputs from the AV perception and world model 312 as described in additional detail below.

Once the vehicle control system 314 receives control inputs from the trajectory follower 310, the AV 300B begins moving, which is represented by the dashed arrow in FIG. 3. The AV sensors, such as the sensors 126, monitor the environment about the AV 300B during movement, which is represented by the raw AV sensors 316 in FIG. 3. The raw AV sensor data is signaled to the AV perception and world model 312.

The AV perception and world model 312 (also called world model 312) as implemented herein may comprise different ways of using the raw AV sensor data with defined constraints on the behavior of the AV 300B to provide input to the remote support 300A, to generate the route at the trajectory planner 308, and to generate control inputs to follow the route at the trajectory follower 310. In one example, the world model 312 receives the sensor data and maintains world objects based on the sensor data, and predicts future behaviors of the perceived objects.

The world model 312 receives sensor data from the raw AV sensors 316, such as from the sensor 126 of FIG. 1, and determines (e.g., converts to, detects, etc.) objects from the sensor data. That is, for example, the world model 312 determines road users and other objects from the received sensor data. For example, the world model 312 can convert a point cloud received from a light detection and ranging (LiDAR) sensor (i.e., an example of the sensor 126) into an object. Sensor data from several sensors can be fused together to determine (e.g., guess the identity of) the objects. Examples of objects include a bicycle, a pedestrian, a vehicle, etc.

The world model 312 can receive sensor information that allows the world model 312 to calculate and maintain additional information for at least some of the detected objects. For example, the world model 312 can maintain a state for at least some of the determined objects. For example, the state for an object can include zero or more of a velocity, a pose, a geometry (such as width, height, and depth), a classification (e.g., bicycle, large truck, pedestrian, road sign, etc.), and a location. As such, the state of an object includes discrete state information (e.g., classification) and continuous state information (e.g., pose and velocity).

The world model 312 may also receive input such as High-Definition (HD) map data. The HD map data is data from a high-definition (i.e., high-precision) map, which can be used by the AV 300B. The HD map data can include accurate information regarding a vehicle transportation network to within a few centimeters. For example, the HD map data can include details regarding road lanes, road dividers, traffic signals, traffic signs, speed limits, and the like.

Using its inputs, the world model 312 may fuse sensor information, track objects, maintain lists of hypotheses for at least some of the dynamic objects (e.g., an object A might be going straight, turning right, or turning left), create and maintain predicted trajectories for each hypothesis, and maintain likelihood estimates of each hypothesis (e.g., object A is going straight with probability 90% considering the object pose/velocity and the trajectory poses/velocities). A pose can be defined by coordinates (x, y, z), roll angle, pitch angle, and/or yaw angle. The objects maintained by the world model 312 can include static objects, dynamic objects, or both.

As mentioned above, inputs from the world model 312 may be used in the trajectory planner 308 to generate (considering an initial state, desired actions, and at least some tracked objects with predicted trajectories) a collision-avoiding, comfortable route (e.g., a trajectory, path, etc., that avoids excessive acceleration, excessive deceleration, and abrupt directional changes). For example, the trajectory planner 308 can receive the points of the virtual route from the virtual AV simulator 306, the objects (and corresponding state information) maintained by the world model 312, and the predicted trajectories and likelihoods of the external objects from the world model 312. The trajectory planner 308 can use at least some of the received information to determine the trajectory, such as the trajectory described above with regards to the route 412.

As described above, the input to the trajectory follower 310 includes the route from the trajectory planner 308, such as the route 412. The trajectory follower 310 is responsible for computing actuator commands such that the AV 300B can accurately follow the route. In some examples, the world model 312 may cooperate directly with the trajectory follower 310 for the trajectory follower 310 to compute emergency actuator commands by providing raw AV perception directly so that the AV 300B can avoid objects detected at the last second while keeping the AV 300B within outermost drivable limits computed by the trajectory planner 308. For example, the AV 300B may be passing by a bicycle using the route when the bicycle swerves for a left turn. An alternative route taking into account this possibility from the trajectory follower 310 may be triggered by the sensor data detecting this change so that new control inputs are determined.

The world model 312 of the AV 300B may transmit, via the communication device(s) of the system 300, images from the AV 300B regarding an environment about the AV 300B, wherein the images are used for generating the display, such as the display 302. FIGS. 5A-6E illustrate examples of such a display, where FIGS. 5A-5F are screenshots that demonstrate a display for remote support and a route for the AV conforming to a virtual path that avoids external objects, and FIGS. 6A-6E are screenshots that demonstrate a display for remote support and a route for the AV conforming to a virtual path interfering with an external object.

In each of FIGS. 5A-6E, the virtual vehicle 402 is forming a virtual route for use in remote support for the AV 404. The inner left border 406A, outer left border 408A, inner right border 406B, and outer right border 408B are labeled only in FIGS. 5A and 6A for clarity.

Referring first to FIGS. 5A-5F, one or more of the left borders 406A, 408A, together with one or more of the right borders 406B, 408B may form a tunnel of the virtual path, such as the virtual path 410. As the virtual vehicle 402 travels through the geographical area, it avoids external objects, such as vehicles 502, signs or pylons 504, trees and shrubs 506, and fences 508. If the route, such as the route 412, generated for the AV 404 is constrained to the tunnel, the AV 404 is unlikely to have any collisions. If an unexpected event occurs, such as an external object crossing in front of the vehicle 502 in FIGS. 5D-5F while the AV 404 is passing the vehicle 502, the contingency planning of the trajectory planner 308 and the trajectory follower 310, with input from the world model 312, are available for safety assurance.

As mentioned above, the virtual AV simulator 306 of the remote support 300A may transmit, via the communication device or devices of the system 300, rules or instructions to an AV, such as the AV 404. The rules or instructions may modify operation of the trajectory planner 308 and the trajectory follower 310 under remote support, including contingency conditions.

For example, instructions or rules may be transmitted to disregard or ignore one or more sensors of the 404B when generating the route 412 at the trajectory planner 308 or following the route 412, such as when generating the control inputs at the trajectory follower 310.

Trajectory control is based on (e.g., depends on) sensor data. However, observation and/or prediction uncertainty may be associated with the sensor data and/or the processing of the sensor data. Observation or prediction uncertainty can arise due to the sensor data themselves, classification uncertainty, hypotheses (intention) uncertainty, actual indecision, occlusions, other reasons for the uncertainty, or a combination thereof. For example, with respect to the sensor data, the sensor data can be affected by weather conditions, accuracy of the sensors, and/or faults in the sensors. The remote support 300A, having the benefit of user observations of the display 302 over time, which is generated in part using sensors of the AV 300B or 404, may be used to identify one or more sensors whose data is inconsistent with the observations. In contrast, and in some circumstances, there is no error in data of a sensor. However, a particular sensor may produce sensor data that would, if used in trajectory control, result in a trajectory that is not intended by the remote support 300A. For example, it may be necessary to drive over a curb during remote support, resulting in sensor output that would otherwise prevent an AV from doing so. An instruction from the virtual AV simulator 306 could result in the trajectory control (the trajectory planner 308, the trajectory follower 310, or both) ignoring that input for a portion of the determined route. Whether a sensor is in error or not, ignoring a sensor for at least part of the route assistance may be desirable.

The rules or instructions from the virtual AV simulator 306 may be used for determining the route 412 using the virtual path 410. For example, an instruction or rule regarding how to generate the route 412 may require the trajectory planner 308 to generate the route 412 constraining the AV 300B, 404 to a tunnel formed of a left border and a right border, such as the inner borders 406A, 406B, or the outer borders 408A, 408B, or some combination thereof. As can be seen from FIGS. 5A-5F, this constraint on conforming the route 412 to the virtual path 410 does not present any problems where the virtual path 410 does not interfere with any external objects, such as the vehicles 502, the signs or pylons 504, and the trees and shrubs 506.

Referring now to FIGS. 6A-6E, illustrated is how this instruction or rule constraining the route 412 to a tunnel formed of left and right borders affects handling of an external object, here a pylon 602, when the virtual path 410 interferes with the external object. As can be seen from FIGS. 6A-6C, the virtual vehicle 402 approaches the pylon 602 head-on. Accordingly, the virtual path approaches the pylon 602 head-on. A forward sensor of the AV 404, which may be one of the sensors 126, detects the presence of the pylon 602 as the AV 404 advances along the route within the tunnel. The range 604 of the forward sensor extending from the front of the AV 404 is shown for illustrative purposes (labeled only in FIG. 6C for clarity). The detection by the raw AV sensors 316 is supplied to the world model 312, which is available to both the trajectory planner 308 and the trajectory follower 310.

Figure 6C:
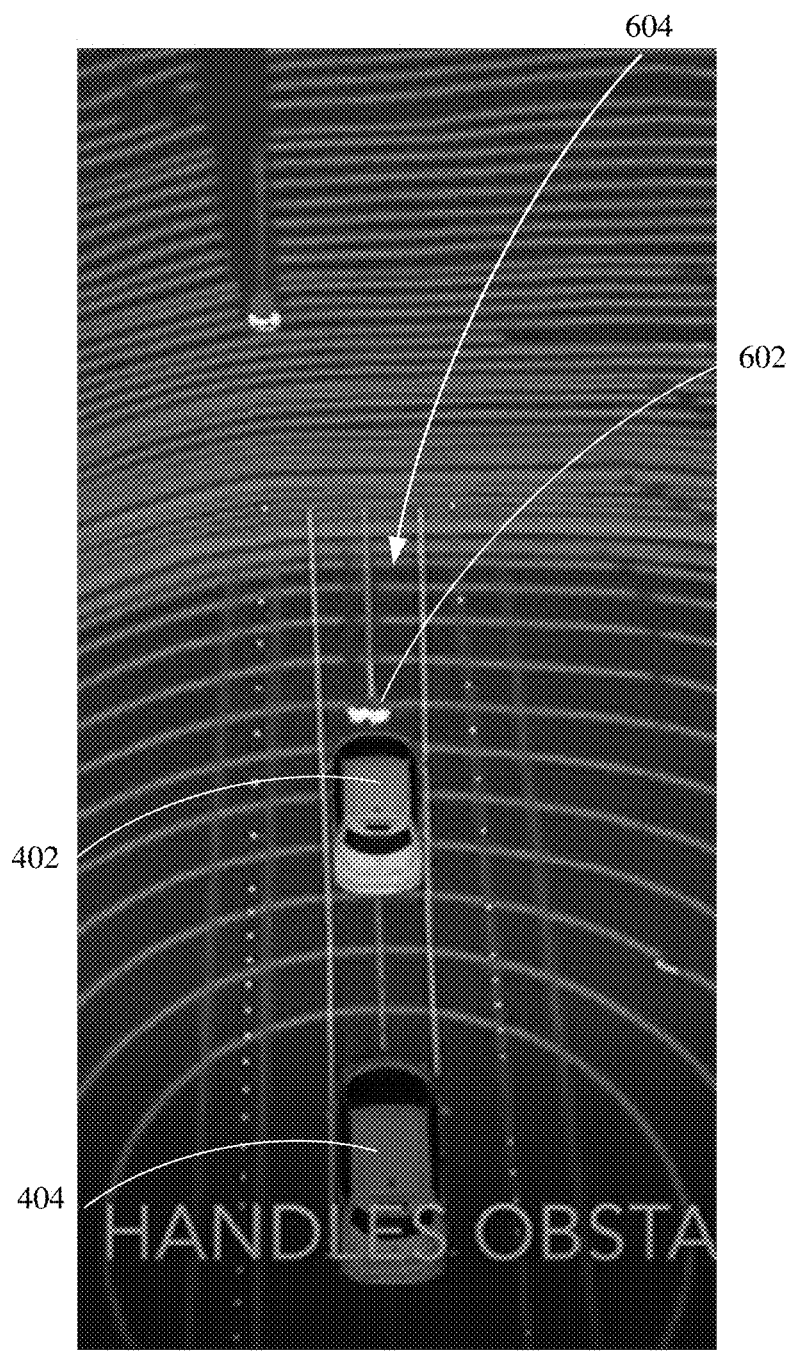
Figures 6D, 6E:
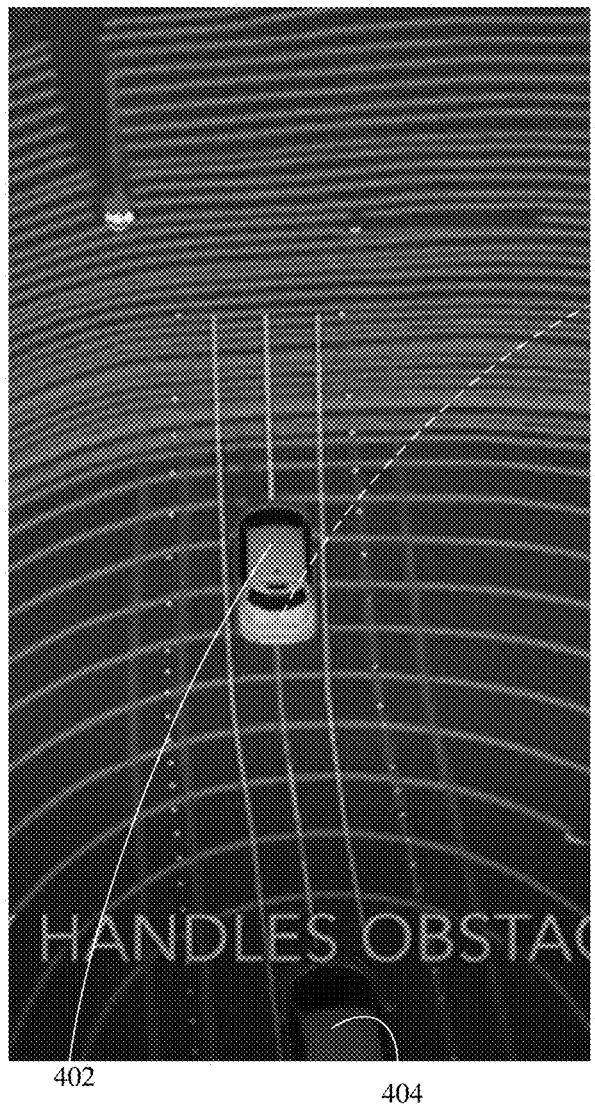

Because the AV 404 remains constrained to the tunnel, and as can be seen from comparing FIG. 6C with FIG. 6B and comparing FIG. 6D with FIGS. 6B and 6C, the spacing between the virtual vehicle 402 and the AV 404 gradually increases as the trajectory control of the AV 404 decelerates the AV 404 while following the route. In FIG. 6D, the virtual vehicle 402 and the pylon 602 interfere (contact, engage, etc.) such that the virtual vehicle 402 covers the pylon 602 in the map. In FIG. 6E, the virtual vehicle 402, and hence the virtual path, passes the pylon 602, and the AV 404 is no longer seen because it has stopped along the route conforming to the tunnel.

As part of the rules or instructions, what should occur as a result of an incomplete route assistance (e.g., failure of the AV to reach the end location of the route assistance or to resolve a route or to advance to a next point of the route) may be transmitted from the virtual AV simulator 306. For example, responsive to the AV falling behind the virtual vehicle within the geographical area by a defined amount while advancing the virtual vehicle through the geographical area, or the AV stopping while the virtual vehicle advances through the geographical area, a current location of the AV may be defined as a new starting location of the route assistance. Then the virtual vehicle may be re-located within the display to the new starting location to begin route assistance once again.

Figure 7:
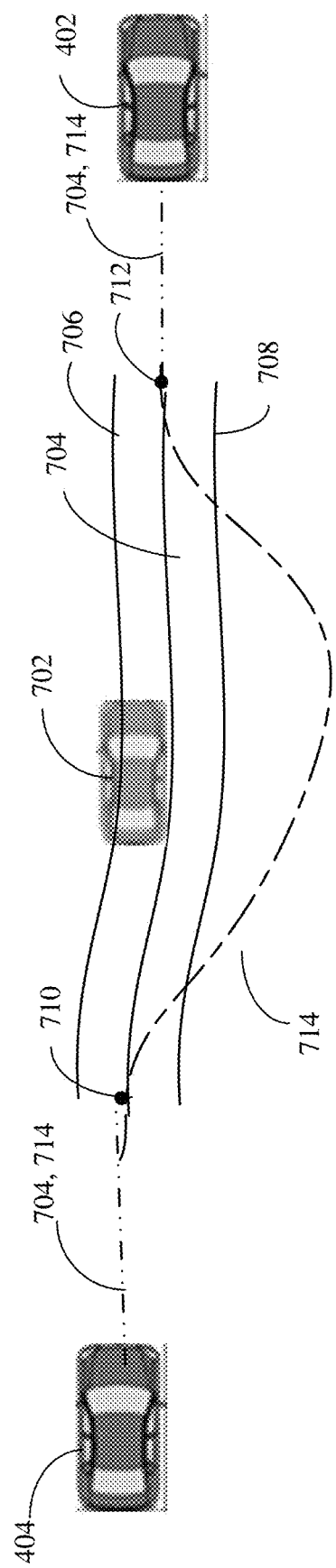
FIG. 7 is a diagram that illustrates an alternative route for the AV conforming to a virtual path interfering with an external object.

An alternative example of a route that conforms to a virtual path is shown in FIG. 7, which is a diagram that illustrates an alternative route for the AV 404 conforming to a virtual path 704 interfering with an external object, which in this example is a vehicle 702. The virtual path 704 is shown partly as a dashed line and partly as a solid line. Specifically, the segment of the virtual path 704 between the AV 404 and a first point 710 of the virtual path 704 is a dashed line, as is the segment of the virtual path 704 between a second point 712 of the virtual path 704 and the virtual vehicle 402. The segment of the virtual path 704 between the first point 710 and the second point 712 is shown with a left border 706 and a right border 708 that forms a tunnel of the virtual path 704 (only a portion of the tunnel is shown for clarity). In this example, the rules or instructions allow the AV 404 to pass outside of the tunnel so as to avoid an external object (i.e., the route is not constrained to the tunnel when being generated in conformance with the virtual path 704).

In FIG. 7, the route 714 generated by the trajectory planner 308 remains within the borders 706, 708 of the tunnel for the segment of the virtual path 704 between the AV 404 and the first point 710 of the virtual path 704. In this example, the trajectory follower 310 generates control inputs for the vehicle control system 314 so that the route 714 is coincident with the virtual path 704 for this segment. The rules or instructions to allow or require the trajectory planner 308 to generate the route 714 to depart or deviate from the virtual path 704 at point 710 and to return to the virtual path 704 at point 712 in order to avoid the object, here the vehicle 702, responsive to the virtual vehicle 402 interfering with the object while forming the virtual path 704. The rules may additionally or alternatively include a rule as to whether to pass the external object on the left of the AV 404 or on the right of the AV 404.

The virtual AV simulator 306 may provide a rule or instruction to the trajectory planner 308 to allow or require the route 714 to conform to the virtual path 704 by departing and returning to the virtual path 704 when an interfering object is detected. When the AV 404 detects that the vehicle 702 is within the tunnel of the virtual path 704 (e.g., using input from the world model 312), and hence would interfere with the trajectory of the AV 404 if the route 714 remains within the tunnel, the trajectory planner 308 may interpret the virtual path 704 as an indicator of which side to pass the object.

In some cases, the trajectory planner 308 may analyze a number of homotopies for each of a number of pairs of points of the virtual path 704 obtained from the virtual AV simulator 306. The homotopies may be analyzed for their compliance with limits to acceleration, deceleration, speed, turning radius, etc. that are also used in the absence of remote support 300A. A homotopy that meets these limits while avoiding other objects may be selected for the route 714.

In FIG. 7, regardless of how the trajectory planner 308 plans the trajectory to avoid the object, the planned trajectory is shown by the long-short dashed line segment of the route 714 between the first point 710 and the second point 712, which forms a homotopic path, also referred to as a homotopy herein. The trajectory follower 310 generates control inputs to the vehicle control system 314 to follow along the homotopy included in the route 714. In summary, the rules provided to the trajectory planner 308 may be used to generate a route that deviates from the tunnel, but is homotopic with respect to the virtual path and any interfering object(s).

Once the AV 404 reaches the second point 712 of the virtual path 704 (i.e., after passing the vehicle 702), the route 714 generated by the trajectory planner 308 remains within the borders 706, 708 of the tunnel for the segment of the virtual path 704 between second point 712 and the current location of the virtual vehicle 402 within the geographical area. In this example, the trajectory follower 310 generates control inputs for the vehicle control system 314 so that the route 714 is coincident with the virtual path 704 for this segment.

The teachings herein allow trajectory control during remote support substantially in real-time without high-bandwidth communications. For example, the trajectory follower 310 can generate the control inputs for the AV 300B to follow the route substantially in real-time while the second portion of the virtual path is being formed using the virtual vehicle. This real-time control may allow the AV 300B to follow the route at substantially a same speed (such as up to a maximum speed such as 25 mph) as the virtual vehicle while the second portion of the virtual path is being formed.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special-purpose processor or circuitry that may include specialized hardware for carrying out any of the methods, algorithms, aspects, or combinations thereof, as described herein. In some implementations, portions of the instructions may be distributed across multiple processors on a single device, or on multiple devices, which may communicate directly or across a network, such as a local area network, a wide area network, the Internet, or a combination thereof.

As used herein, the terminology "example," "embodiment," "implementation," "aspect," "feature," or "element" indicate serving as an example, instance, or illustration. Unless expressly indicated otherwise, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise or clearly indicated otherwise by the context, "X includes A or B" is intended to indicate any of the natural inclusive permutations thereof. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of operations or stages, elements of methods disclosed herein may occur in various orders or concurrently. Additionally, elements of methods disclosed herein may occur with other elements not explicitly presented and described herein. Furthermore, not all elements of methods described herein may be required to implement a method in accordance with this disclosure. Although aspects, features, and elements are described herein in particular combinations, each aspect, feature, or element may be used independently or in various combinations with or without other aspects, features, and/or elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. An apparatus for traveling through a transportation network, comprising:
   a communication device; and
   a processor in connection with the communication device and configured to perform a method comprising:
      generating a display that includes a geographical area about a starting location for route assistance for an autonomous vehicle (AV) through the transportation network, and a virtual vehicle at the starting location;
      forming a virtual path for the route assistance using the virtual vehicle, comprising:
         forming a first portion of the virtual path by advancing the virtual vehicle from the starting location while the AV remains at the starting location within the display; and
         forming a second portion of the virtual path by, after the virtual vehicle departs from the starting location, extrapolating from the virtual vehicle through the geographical area to a stopping location or an ending location of the route assistance; and
      continually transmitting, via the communication device, points along the virtual path to a trajectory planner of the AV while the virtual vehicle advances through the geographical area, wherein the trajectory planner generates a route for the AV conforming to the virtual path, and wherein forming the second portion occurs, at least in part, while the AV advances along the route behind the virtual vehicle relative to a direction of travel of the virtual vehicle.

2. The apparatus of claim 1, wherein the method comprises:
   receiving, for the AV, a request for the route assistance through the transportation network, wherein the request includes the starting location.

3. The apparatus of claim 1, wherein:
   the virtual path comprises a left border and a right border forming a tunnel, and wherein the route for the AV is constrained to remain within the tunnel.

4. The apparatus of claim 1, wherein:
   the route includes a deviation from the virtual path that is homotopic between two points of the virtual path.

5. The apparatus of claim 1, wherein the method further comprises:
   transmitting, via the communication device, instructions to the trajectory planner regarding how to generate the route using the virtual path.

6. The apparatus of claim 1, wherein the method further comprises:
   transmitting, via the communication device, instructions to the AV to disregard one or more sensors of the AV when following the route.

7. The apparatus of claim 1, wherein generating the display comprises:
   generating a representation of the AV at the starting location, wherein the virtual vehicle has a same pose as the AV at the starting location;
   continually updating representations of the virtual vehicle and the virtual path extending from the AV to a current location of the virtual vehicle, and extending from the virtual vehicle to an end of the virtual path; and
   responsive to the virtual path having a defined distance from the starting location:
      continually updating the representations of the AV while the AV advances along the route behind the virtual vehicle relative to a direction of travel of the virtual vehicle.

8. The apparatus of claim 1, further comprising:
   a simulator including an interface configured to receive input from a user defining the virtual path, the simulator providing output corresponding to the virtual path to the processor for generating the display.

9. The apparatus of claim 1, wherein the method further comprises:
   responsive to the AV falling behind the virtual vehicle within the geographical area by a defined amount while advancing the virtual vehicle through the geographical area, defining a current location of the AV as a new starting location of the route assistance.

10. The apparatus of claim 1, wherein the method further comprises:
    responsive to the AV stopping while the virtual vehicle advances through the geographical area, defining a current location of the AV as a new starting location of the route assistance.

11. The apparatus of claim 1, wherein the generating the display comprises:
    receiving images from the AV; and
    including, in the display, objects and drivable areas derived from the images.

12. A system for traveling through a transportation network, comprising:
    a communication device;
    a processor in connection with the communication device and configured to perform a method comprising:
       transmitting, via the communication device, a request for route assistance through the transportation network for an autonomous vehicle (AV); and
       continually receiving points along a virtual path for the route assistance, the virtual path created by:
          generating a display including a geographical area about a starting location of the route assistance and a virtual vehicle at the starting location; and
          forming the virtual path using the virtual vehicle, comprising:
             forming a first portion of the virtual path by advancing the virtual vehicle from the starting location while the AV is remains at the starting location within the display; and
             forming a second portion of the virtual path by, after the virtual vehicle departs from the starting location, extrapolating from the virtual vehicle through the geographical area to a stopping location or an ending location of the route assistance, wherein continually receiving the points comprises continually receiving, via the communication device, the points along the virtual path while the virtual vehicle advances through the geographical area;
    a trajectory planner that generates a route for the AV conforming to the virtual path using the points; and
    a trajectory follower that generates control inputs for the AV to follow the route while the virtual vehicle advances through the geographical area, wherein forming the second portion occurs, at least in part, while the AV advances along the route behind the virtual vehicle relative to a direction of travel of the virtual vehicle.

13. The system of claim 12, wherein the method further comprises:
   receiving, via the communication device, rules regarding at least one of how to generate the route or how to generate the control inputs.

14. The system of claim 13, wherein the virtual path comprises a left border and a right border forming a tunnel, and wherein the rules require the trajectory planner to generate the route constraining the AV to the tunnel.

15. The system of claim 13, wherein the rules require the trajectory follower to generate the control inputs while ignoring at least one sensor of the AV.

16. The system of claim 13, wherein the rules require the trajectory planner to generate the route to deviate to either a left or a right of the virtual path between two points of the virtual path to avoid an object responsive to the virtual vehicle interfering with the object while forming the virtual path, a deviation in the route being homotopic with respect to the virtual path.

17. The system of claim 12, wherein the method further comprises:
   transmitting, via the communication device, images from the AV regarding environment about the AV, wherein the images are used for generating the display.

18. The system of claim 12, wherein:
   the trajectory follower generates the control inputs for the AV to follow the route substantially in real-time while the second portion of the virtual path is formed.

19. The system of claim 18, wherein:
   the control inputs cause the AV to follow the route at substantially a same speed as the second portion of the virtual path is formed.

20. An autonomous vehicle (AV) for traveling through a transportation network, comprising:
   a communication device; and
   one or more processors in connection with the communication device and implementing:
   a trajectory planner configured to:
      continually receive, through the communication device, points along a virtual path for route assistance through the transportation network, the virtual path created by:
         generating a display, the display including a geographical area about a starting location for the route assistance and a virtual vehicle at the starting location; and
         forming the virtual path using the virtual vehicle, comprising:
            forming a first portion of the virtual path by advancing the virtual vehicle from the starting location while the AV is at the starting location; and
            forming a second portion of the virtual path by, after the virtual vehicle departs from the starting location, extrapolating from the virtual vehicle through the geographical area to a stopping location or an ending location of the route assistance, wherein continually receiving the points comprises continually receiving, via the communication device, the points along the virtual path while the virtual vehicle advances through the geographical area; and
      generate a route for the AV conforming to the virtual path using the points; and
   a trajectory follower configured to generate control inputs for the AV to advance along the route behind the virtual vehicle relative to a direction of travel of the virtual vehicle while the virtual vehicle forms the second portion of the virtual path.

* * * * *